United States Patent
Kashiwase et al.

(10) Patent No.: US 9,961,687 B2
(45) Date of Patent: May 1, 2018

(54) BASE STATION AND COMMUNICATION CONTROL METHOD

(71) Applicant: KYOCERA CORPORATION, Kyoto (JP)

(72) Inventors: Susumu Kashiwase, Machida (JP); Hiroyuki Adachi, Kawasaki (JP)

(73) Assignee: KYOCERA Corporation, Kyoto (JP)

( * ) Notice: Subject to any disclaimer, the term of this patent is extended or adjusted under 35 U.S.C. 154(b) by 41 days.

(21) Appl. No.: 14/416,833

(22) PCT Filed: Jul. 23, 2013

(86) PCT No.: PCT/JP2013/069903
§ 371 (c)(1),
(2) Date: Jan. 23, 2015

(87) PCT Pub. No.: WO2014/017478
PCT Pub. Date: Jan. 30, 2014

(65) Prior Publication Data
US 2015/0208420 A1   Jul. 23, 2015

Related U.S. Application Data

(60) Provisional application No. 61/676,724, filed on Jul. 27, 2012, provisional application No. 61/676,737, (Continued)

(51) Int. Cl.
*H04W 72/04* (2009.01)
*H04L 5/00* (2006.01)
(Continued)

(52) U.S. Cl.
CPC ......... *H04W 72/0486* (2013.01); *H04L 5/001* (2013.01); *H04W 72/0426* (2013.01);
(Continued)

(58) Field of Classification Search
CPC . H04W 72/04; H04W 36/00; H04W 72/0406; H04W 72/0426; H04W 72/0486;
(Continued)

(56) References Cited

U.S. PATENT DOCUMENTS

| 9,338,785 B2* | 5/2016 | Frederiksen | ...... H04W 72/0426 |
| 2012/0014357 A1* | 1/2012 | Jung | ...... H04L 5/0035 370/332 |

(Continued)

FOREIGN PATENT DOCUMENTS

| WO | 2011/052643 A1 | 5/2011 |
| WO | 2012/147884 A1 | 11/2012 |

OTHER PUBLICATIONS

International Search Report; PCT/JP2013/069903; dated Aug. 20, 2013.
(Continued)

*Primary Examiner* — Jae Y Lee
*Assistant Examiner* — Aixa Guadalupe-Cruz
(74) *Attorney, Agent, or Firm* — Studebaker & Brackett PC

(57) ABSTRACT

A base station according to a first feature uses a plurality of carriers for radio communications. The base station includes: a receiver that receives neighbor base station information on user terminals connected to a neighbor base station, wherein the neighbor base station information is transmitted from the neighbor base station; and a controller that changes a carrier configuration of at least one carrier among the plurality of carriers based on the neighbor base station information.

5 Claims, 22 Drawing Sheets

Related U.S. Application Data filed on Jul. 27, 2012, provisional application No. 61/676,755, filed on Jul. 27, 2012.

(51) Int. Cl.
*H04W 92/20* (2009.01)
*H04W 36/00* (2009.01)
*H04W 36/22* (2009.01)

(52) U.S. Cl.
CPC .......... *H04L 5/0048* (2013.01); *H04L 5/0053* (2013.01); *H04L 5/0092* (2013.01); *H04W 36/0061* (2013.01); *H04W 36/22* (2013.01); *H04W 92/20* (2013.01)

(58) Field of Classification Search
CPC .... H04W 72/0493; H04L 5/001; H04L 12/24; H04L 41/0896
See application file for complete search history.

(56) References Cited

U.S. PATENT DOCUMENTS

| | | | |
|---|---|---|---|
| 2012/0213123 A1 | 8/2012 | Futaki | |
| 2013/0107862 A1* | 5/2013 | Yang | H04L 5/001 370/331 |
| 2013/0121167 A1* | 5/2013 | Wong | H04W 36/06 370/242 |
| 2014/0051427 A1 | 2/2014 | Yamazaki et al. | |
| 2014/0226605 A1* | 8/2014 | Xu | H04W 24/02 370/329 |
| 2015/0092750 A1* | 4/2015 | Huang | H04W 36/08 370/331 |

OTHER PUBLICATIONS

3GPP TS 36.300 V10.8.0 (Jun. 2012); 3rd Generation Partnership Project; Technical Specification Group Radio Access Network; Evolved Universal Terrestrial Radio Access (E-UTRA); and Evolved Universal Terrestrial Radio Access Network (E-UTRAN); Overall description; Stage 2 (Release 10).

* cited by examiner

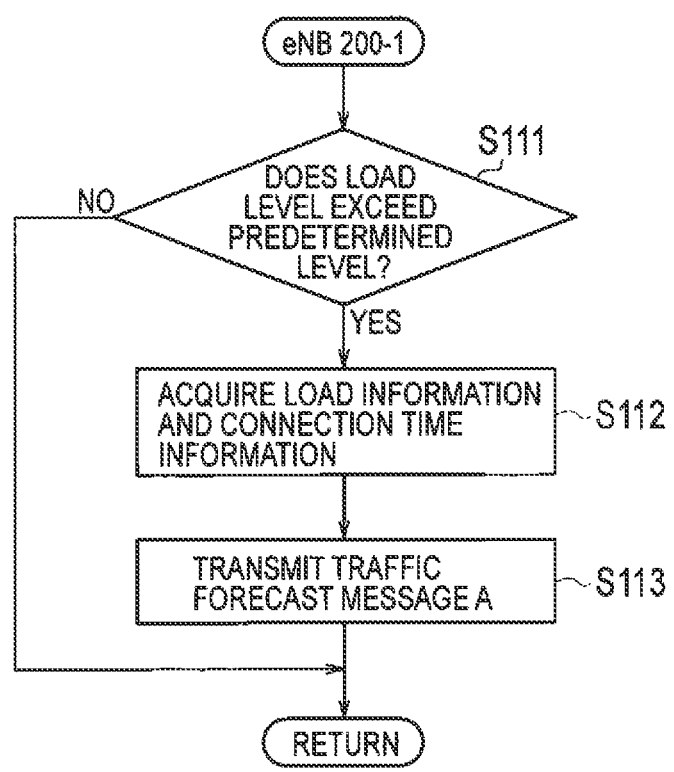

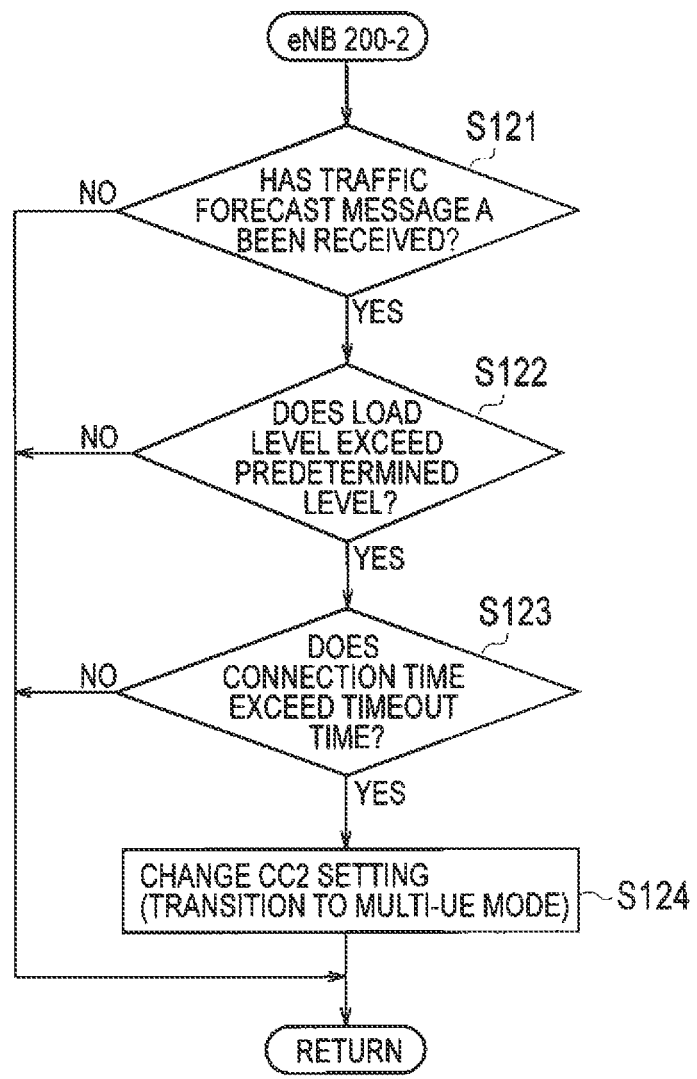

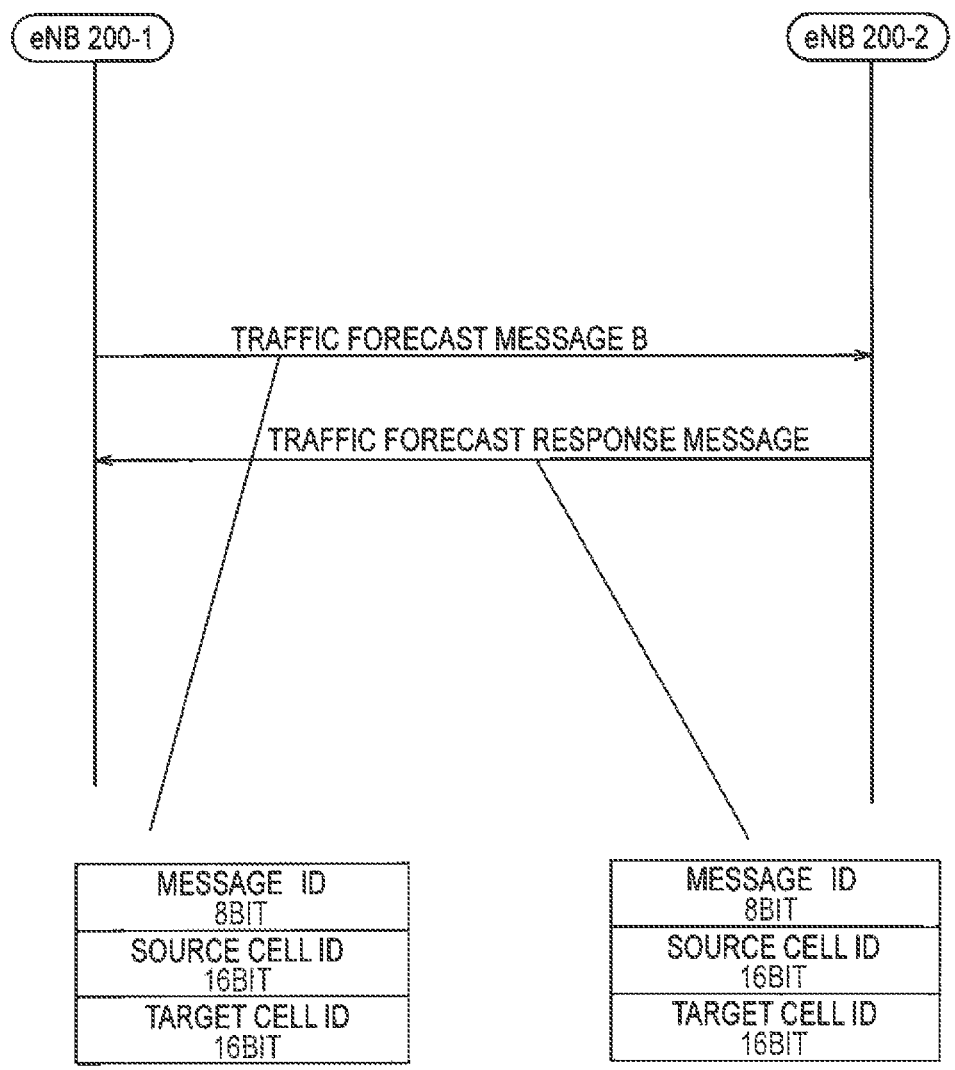

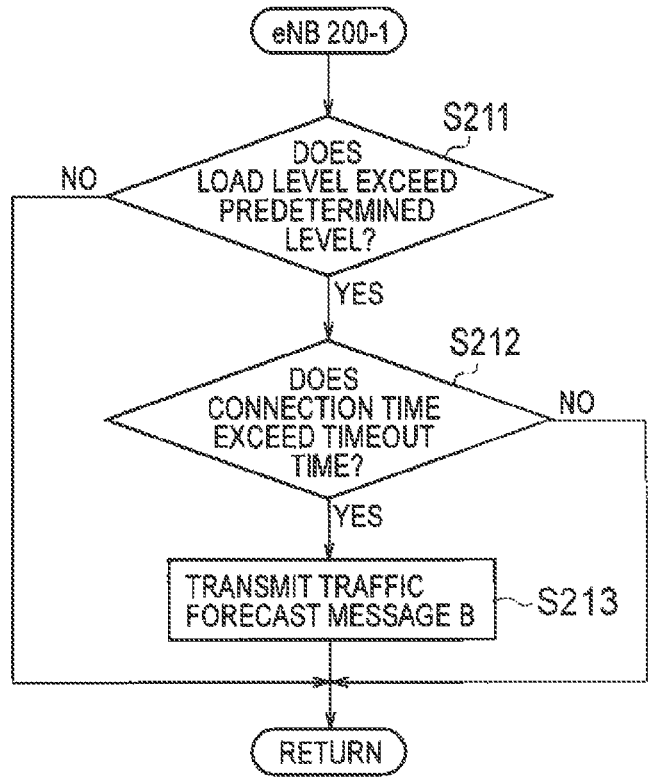
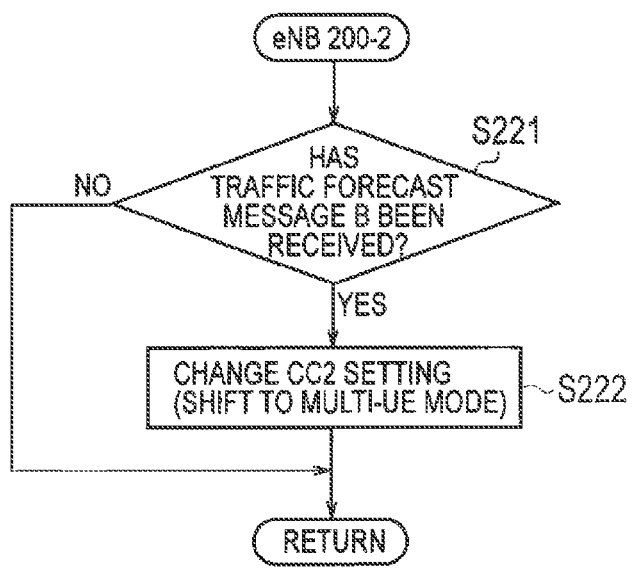

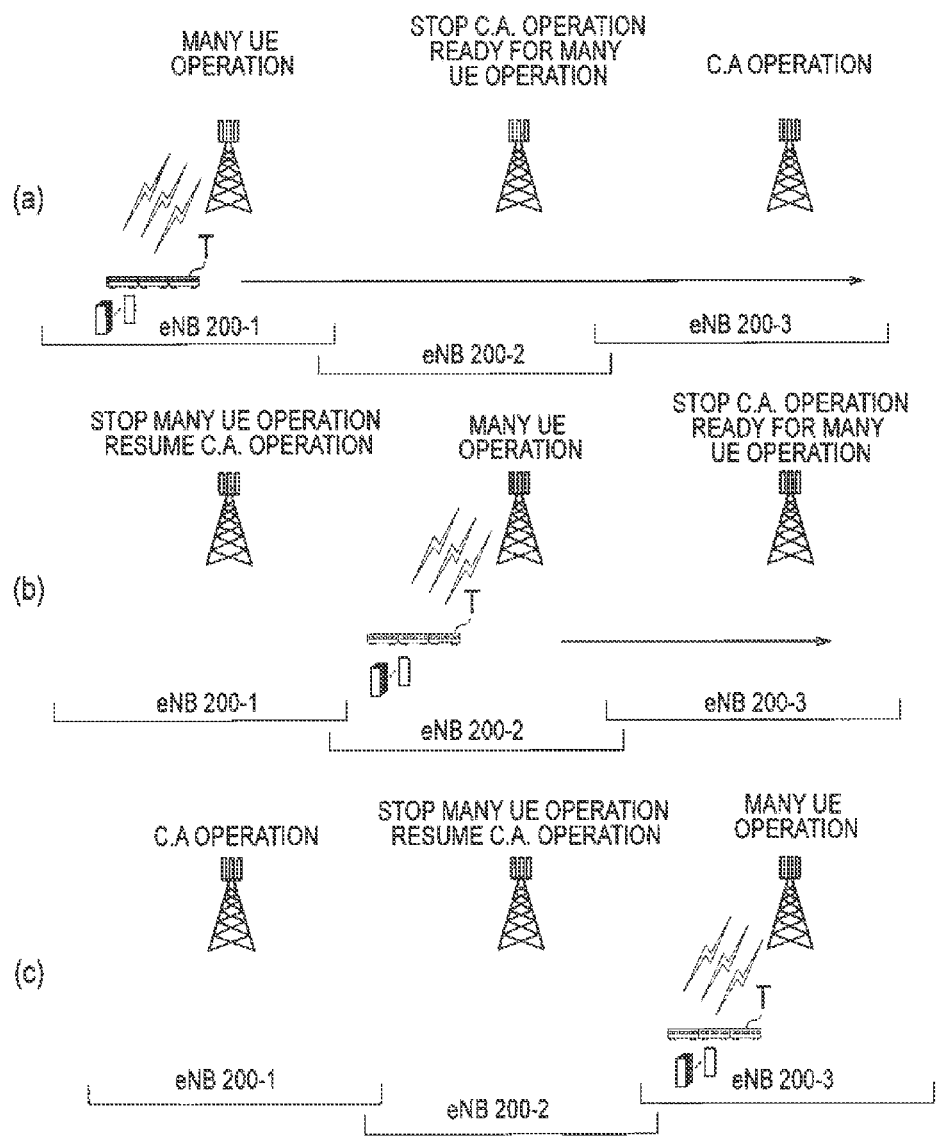

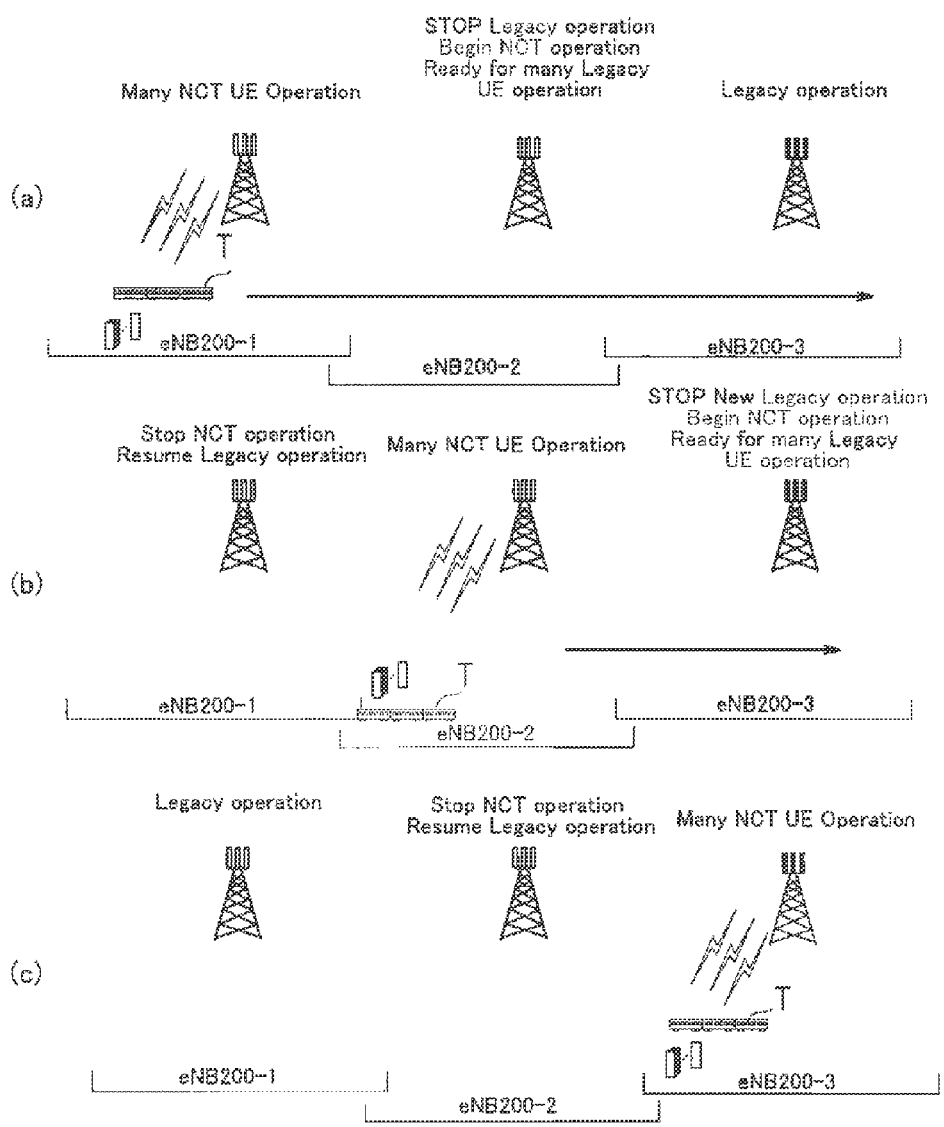

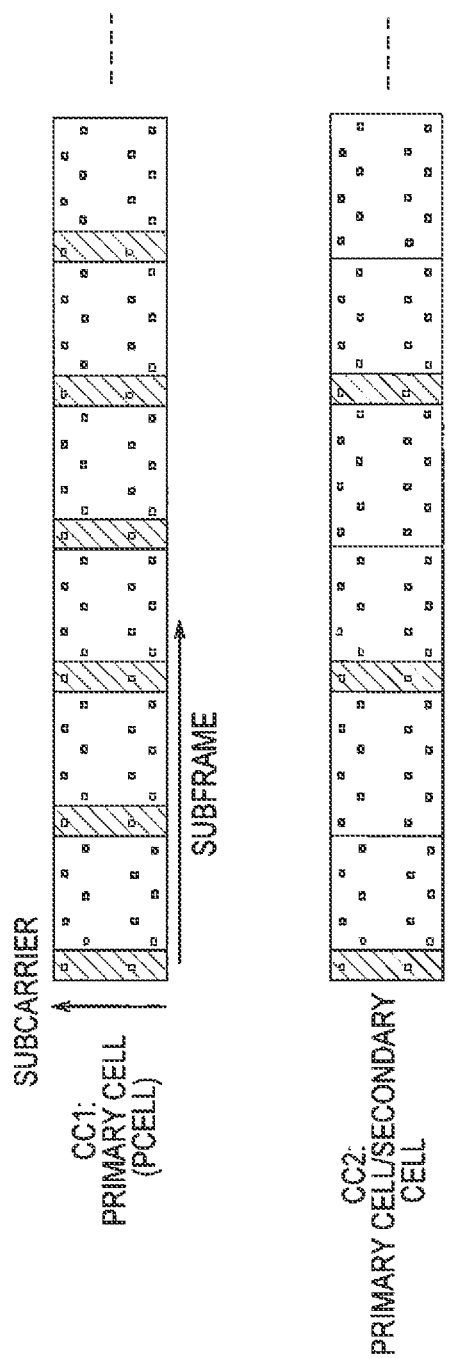

BASE STATION AND COMMUNICATION CONTROL METHOD

TECHNICAL FIELD

The present invention relates to a base station and a communication control method in a mobile communication system.

BACKGROUND ART

In 3GPP (3rd Generation Partnership Project) which is a project aiming to standardize mobile communication systems, the standardization of an LTE Advanced, which is a sophisticated version of LTE (Long Term Evolution), is conducted after 3GPP Release 10.

The LTE Advanced introduces carrier aggregation, in which carriers in the LTE are positioned as component carriers and multicarrier communications are performed by using an aggregation of a plurality of component carriers, in order to achieve a wider band while ensuring backward compatibility with the LTE (see Non-patent Document 1).

PRIOR ART DOCUMENT

Non-Patent Document

Non-patent Document 1: 3GPP TS 36.300 V10.8.0 (2012-06)

SUMMARY OF THE INVENTION

In the carrier aggregation, a base station sets to operate one component carrier (a first component carrier) as a primary cell, and sets to operate another component carrier (a second component carrier) as a secondary cell. The primary cell is a cell that transmits a control signal and user data. The secondary cell is a cell that transmits user data.

In the carrier aggregation, it is possible to achieve a wider band; however there is a problem that the number of user terminals which can be accommodated by a base station is smaller as compared with a conventional carrier operation method in which communication is performed by using each of carriers separately.

Therefore, the present invention provides a base station and a communication control method, by which it is possible to appropriately operate a plurality of carriers.

A base station according to a first feature uses a plurality of carriers for radio communications. The base station includes: a receiver that receives neighbor base station information on user terminals connected to a neighbor base station, wherein the neighbor base station information is transmitted from the neighbor base station; and a controller that changes a carrier configuration of at least one carrier among the plurality of carriers based on the neighbor base station information.

A communication control method according to a second feature is used in a base station that uses a plurality of carriers for radio communications. The communication control method includes: a step of receiving neighbor base station information on user terminals connected to a neighbor base station, wherein the neighbor base station information is transmitted from the neighbor base station; and a step of changing a carrier configuration of at least one carrier among the plurality of carriers based on the neighbor base station information. second component carrier second component carrier second component carrier

BRIEF DESCRIPTION OF THE DRAWINGS

FIG. 10 is an operation flow diagram of the eNB according to the first embodiment.

FIG. 11 is an operation flow diagram of neighboring eNB according to the first embodiment.

FIG. 12 is a diagram for explaining a message configuration regarding a Traffic Forecast message B according to the second embodiment.

FIG. 13 is an operation flow diagram of the eNB according to the second embodiment.

FIG. 14 is an operation flow diagram of the neighboring eNB according to the second embodiment.

FIG. 15 is a diagram for explaining an operating environment of the LTE system according to a third embodiment.

FIG. 25 is a diagram for explaining an illustrative example 2 of an operation according to the fourth embodiment.

FIG. 26 is a configuration diagram of the radio frame according to other embodiments.

DESCRIPTION OF EMBODIMENTS

Figure 1:
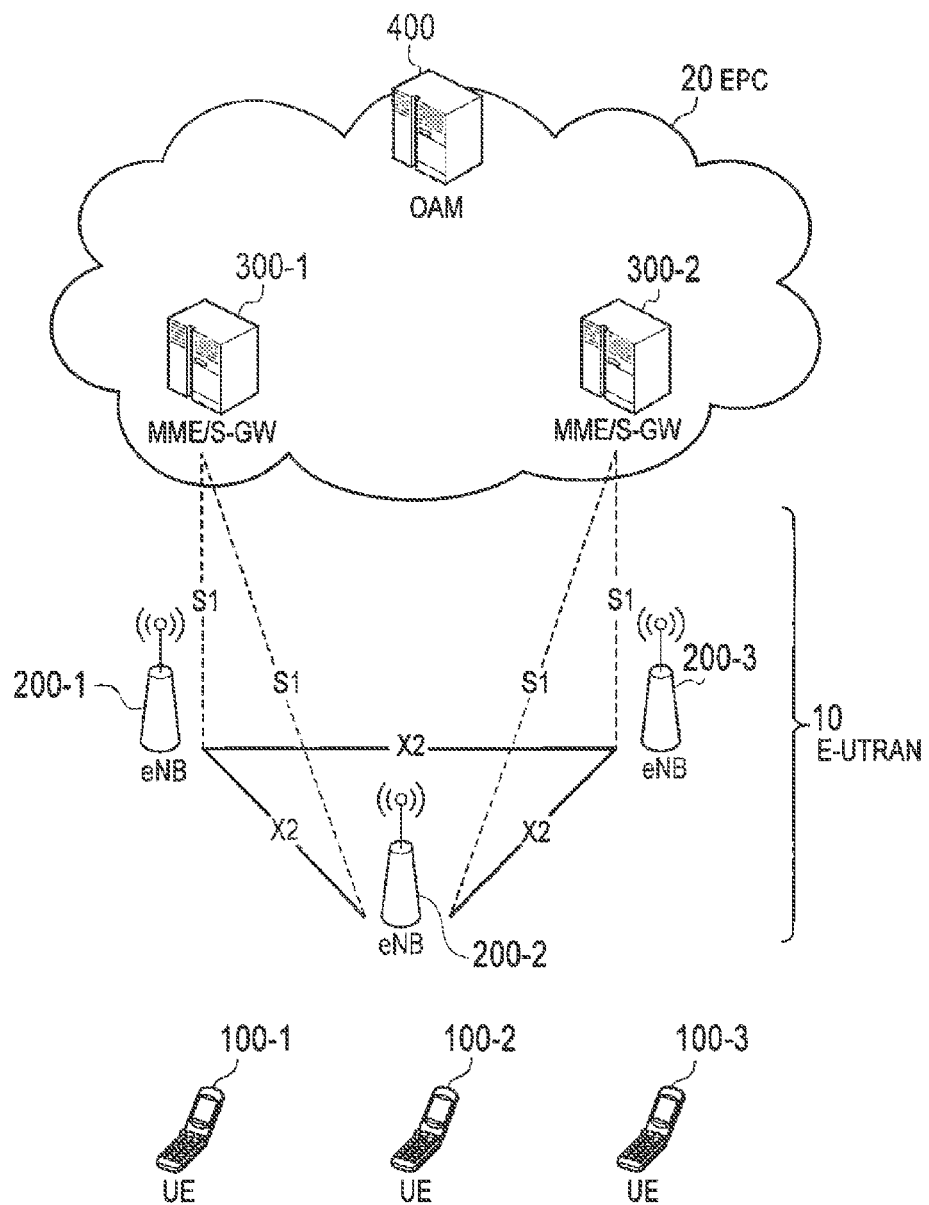
FIG. 1 is a configuration diagram of a mobile communication system.

A base station according to a first embodiment to a fourth embodiment uses a plurality of carriers for radio communications. The base station receives neighbor base station information on user terminals connected to a neighbor base station, wherein the neighbor base station information is transmitted from the neighbor base station. The base station changes a carrier configuration of at least one carrier among the plurality of carriers based on the neighbor base station information.

The first embodiment to the third embodiment relate to a mobile communication system that supports carrier aggregation. In the carrier aggregation, multicarrier communication is performed by using a first component carrier operated as a primary cell that transmits a control signal and user data, and a second component carrier operated as a secondary cell that transmits user data.

Since the primary cell (the first component carrier) is able to transmit the control signal as well as the user data, the primary cell is able to singly accommodate a user terminal.

On the other hand, since the secondary cell (the second component carrier) is not able to transmit the control signal, the secondary cell is not able to singly accommodate the user terminal. That is, the secondary cell is assumed to be used as a combination with the primary cell.

In addition, the secondary cell (the second component carrier) may not only be one, but may also be more than one.

The fourth embodiment relates to mobile communication systems supporting a new carrier configuration (NCT: New Carrier Type). In the NCT, it is possible to increase the transmission efficiency of user data by setting a carrier configuration different from a legacy carrier configuration (LCT: Legacy Carrier Type). A carrier (NCT carrier) adopting the NCT can only accommodate user terminals supporting NCT.

For example, the density of reference signals in NCT carrier is set to low compared with LCT carrier. Alternatively, the NCT carrier does not have a physical downlink control channel (PDCCH) for transmitting downlink control signals. In this case, the NCT carrier has a carrier configuration similar to aforementioned secondary cell. Alternatively, in the NCT carrier, an ePDCCH (enhanced PDCCH) for transmitting downlink control signals is provided instead of the PDCCH.

(1) First Embodiment

Hereinafter, the first embodiment will be described.

(1.1) Overview of First Embodiment

A communication control method according to the present embodiment includes a step A of transmitting, by a base station, a notification message regarding a load level of the base station to a neighboring base station, and a step B of changing, by the neighboring base station, the carrier configuration of a second component carrier such that the second component carrier is operated as a primary cell, on the basis of the notification message.

Furthermore, the "transmitting the notification message" includes the case of indirectly transmitting the notification message to the neighboring base station via an upper network entity as well as the case of directly transmitting the notification message to the neighboring base station. The "neighboring base station" may be a concept including a next neighboring base station.

Furthermore, the "changing the carrier configuration of the second component carrier" includes the case of changing the carrier configuration such that only a part of the secondary component carriers is operated as the primary cell as well as the case of changing the carrier configuration such that all the secondary component carriers are operated as the primary cell. In the former case, the carrier aggregation is stopped, but in the latter case, the carrier aggregation is partially continued.

In addition, the "operating only a part of the secondary component carriers as the primary cell" includes operating a part of subframes of one secondary component carrier as the primary cell when there is one secondary component carrier, and operating one of a plurality of secondary component carriers as the primary cell when there are the plurality of secondary component carriers.

According to the communication control method, when an increase in the load level of the neighboring base station is estimated from the notification message (for example, it is estimated that the number of user terminals accommodated by the neighboring base station is increased), the neighboring base station changes the second component carrier to the primary cell in preparation for the increase in the load level. Thus, when the load level of the neighboring base station is actually increased, the neighboring base station is able to cover the increase of the load level by using the second component carrier for which the carrier configuration to the primary cell is changed.

Consequently, in accordance with the communication control method according to the present embodiment, it is possible to appropriately operate a plurality of component carriers.

In the present embodiment, the notification message may include duration time information indicating a duration time of a state in which the load level of the base station exceeds a predetermined level. In this way, the neighboring base station is able to estimate the timing at which the load level thereof increases from the duration time information, and to appropriately determine the timing for changing the second component carrier to the primary cell.

In addition, the "predetermined level" below indicates the load level at which the base station may be recognized to be in a high load state, and for example, may be a load level corresponding to 80% to 90% of load capacity of the base station.

(1.2) Overview of Mobile Communication System

FIG. 1 is a configuration diagram of a mobile communication system according to the present embodiment. The mobile communication system according to the present embodiment is an LTE system configured on the basis of an LTE Advanced (on and after 3GPP Release 10).

As illustrated in FIG. 1, the LTE system includes a plurality of UEs (User Equipments) 100, E-UTRAN (Evolved-UMTS Terrestrial Radio Access Network) 10, and EPC (Evolved Packet Core) 20. In the present embodiment, the E-UTRAN 10 and the EPC 20 constitute a network.

The UE 100 is a mobile radio communication device and performs radio communication with a cell (a serving cell) with which a connection is established. The UE 100 corresponds to a user terminal. The UE 100 uses a primary cell and a secondary cell, as the serving cell, and performs radio communication with the serving cell, when performing multicarrier communication by using a carrier aggregation.

The E-UTRAN 10 includes a plurality of eNBs (evolved Nodes-B) 200. The eNB 200 corresponds to a base station. The eNB 200 controls a cell and performs radio communication with the UE 100 that establishes a connection with the cell. In addition, the "cell" is used as a term indicating a minimum unit of a radio communication area, and is also used as a term indicating a function of performing radio communication with the UE 100.

The eNB 200 has a radio resource management (RRM) function, a routing function of user data, and a measurement control function for mobility control and scheduling.

The EPC 20 includes MMEs (Mobility Management Entities)/S-GWs (Serving-Gateways) 300, and OAM (Operation and Maintenance) 400.

The MME is a network node for performing various mobility controls and the like, for the UE 100 and corresponds to a control station. The S-GW is a network node that performs transfer control of the user data and corresponds to a mobile switching center.

The eNB 200s are connected mutually via an X2 interface. Furthermore, the eNB 200 is connected to the MME/S-GW 300 via an S1 interface.

The OAM 400 is a server device managed by an operator and performs maintenance and monitoring of the E-UTRAN 10.

Next, the configurations of the UE 100 and the eNB 200 will be described.

Figure 2:
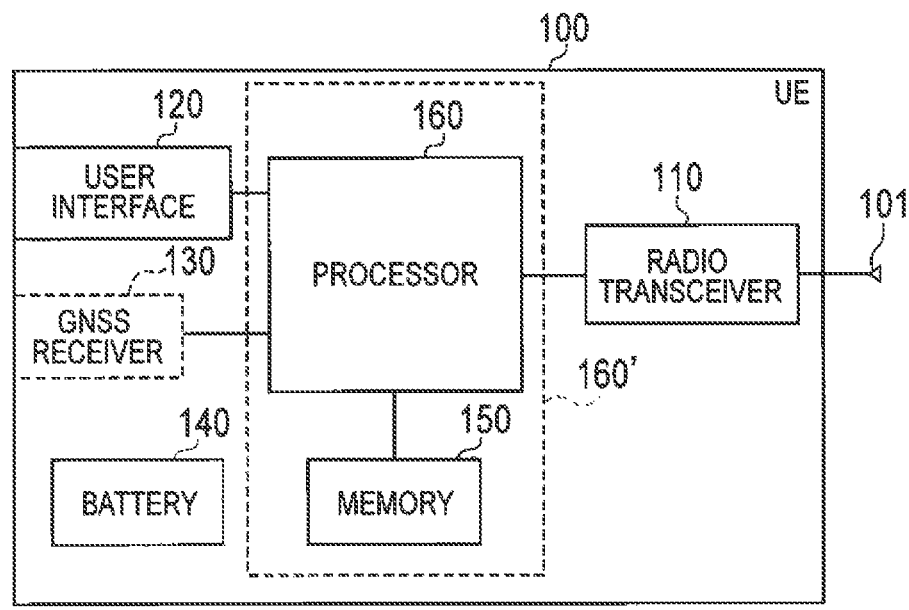
FIG. 2 is a block diagram of UE.

FIG. 2 is a block diagram of the UE 100. As illustrated in FIG. 2, the UE 100 includes an antenna 101, a radio transceiver 110, a user interface 120, a GNSS (Global Navigation Satellite System) receiver 130, a battery 140, a memory 150, and a processor 160. In addition, the UE 100 may not have the GNSS receiver 130. Furthermore, the memory 150 is integrated with the processor 160, and this set (that is, a chipset) may be called a processor 160'.

The antenna 101 and the radio transceiver 110 are used to transmit and receive a radio signal. The antenna 101 includes a plurality of antenna elements. The radio transceiver 110 converts a baseband signal output from the processor 160 into a radio signal, and transmits the radio signal from the antenna 101. Furthermore, the radio transceiver 110 converts a radio signal received in the antenna 101 into a baseband signal, and outputs the baseband signal to the processor 160.

The user interface 120 is an interface with a user carrying the UE 100, and includes, for example, a display, a microphone, a speaker, and various buttons. The user interface 120 receives an operation from a user and outputs a signal indicating the content of the operation to the processor 160.

The GNSS receiver 130 receives a GNSS signal in order to obtain location information indicating a geographical location of the UE 100, and outputs the received signal to the processor 160.

The battery 140 stores a power to be supplied to each block of the UE 100.

The memory 150 stores a program to be executed by the processor 160 and information to be used for a process by the processor 160.

The processor 160 includes a baseband processor configured to perform modulation and demodulation, coding and decoding and the like of the baseband signal, and a CPU (Central Processing Unit) configured to perform various processes by executing the program stored in the memory 150. The processor 160 may further include a codec that performs encoding and decoding of sound and video signals.

Furthermore, the processor 160 implements various communication protocols which will be described later.

Figure 3:
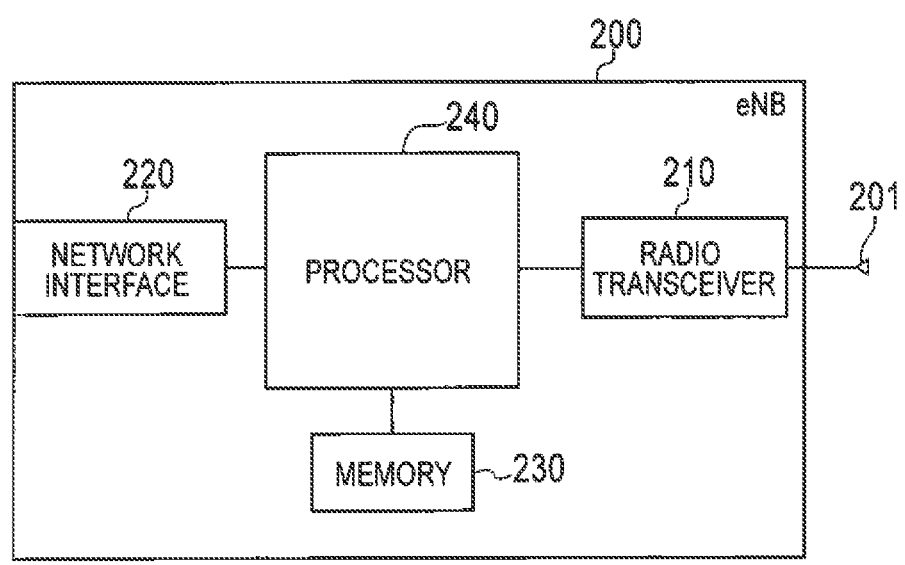
FIG. 3 is a block diagram of eNB.

FIG. 3 is a block diagram of the eNB 200. As illustrated in FIG. 3, the eNB 200 includes an antenna 201, a radio transceiver 210, a network interface 220, a memory 230, and a processor 240. The memory 230 and the processor 240 constitute a controller.

The antenna 201 and the radio transceiver 210 are used to transmit and receive a radio signal. The antenna 201 includes a plurality of antenna elements. The radio transceiver 210 converts a baseband signal output from the processor 240 into a radio signal, and transmits the radio signal from the antenna 201. Furthermore, the radio transceiver 210 converts a radio signal received in the antenna 201 into a baseband signal, and outputs the baseband signal to the processor 240.

The network interface 220 is connected to the neighboring eNB 200 via the X2 interface and is connected to the MME/S-GW 300 via the S1 interface. The network interface 220 is used in communication performed on the X2 interface and communication performed on the S1 interface.

The memory 230 stores a program to be executed by the processor 240 and information to be used for a process by the processor 240.

The processor 240 includes a baseband processor that performs modulation and demodulation, and encoding and decoding of the baseband signal and a CPU that executes the program stored in the memory 230 to perform various processes. Furthermore, the processor 240 implements various communication protocols which will be described later.

Figure 4:
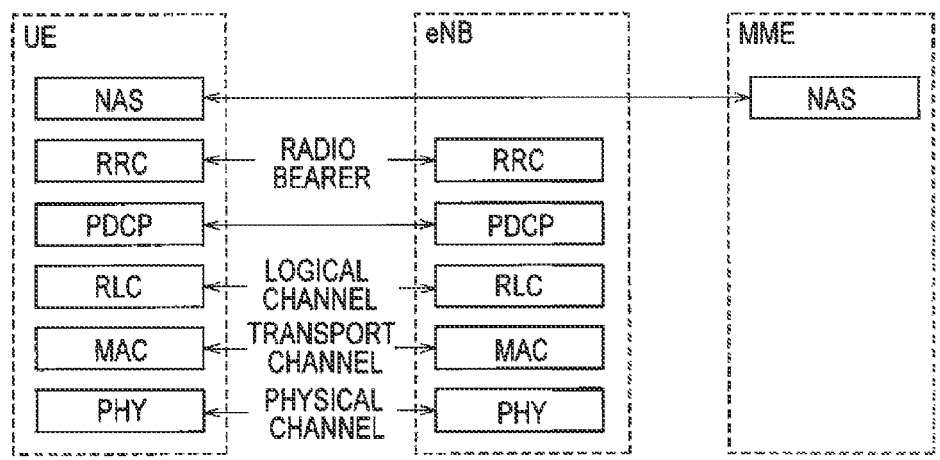
FIG. 4 is a protocol stack diagram of a radio interface in an LTE system.

FIG. 4 is a protocol stack diagram of a radio interface in the LTE system.

As illustrated in FIG. 4, the radio interface protocol is classified into a layer 1 to a layer 3 of an OSI reference model, wherein the layer 1 is a physical (PHY) layer. The layer 2 includes a MAC (Medium Access Control) layer, an RLC (Radio Link Control) layer, and a PDCP (Packet Data Convergence Protocol) layer. The layer 3 includes an RRC (Radio Resource Control) layer.

The PHY layer performs encoding and decoding, modulation and demodulation, antenna mapping and demapping, and resource mapping and demapping. The PHY layer provides a transmission service to an upper layer by using a physical channel. Between the PHY layer of the UE 100 and the PHY layer of the eNB 200, data is transmitted through the physical channel.

The MAC layer performs preferential control of data, and a retransmission process and the like by hybrid ARQ (HARQ). Between the MAC layer of the UE 100 and the MAC layer of the eNB 200, data is transmitted through a transport channel. The MAC layer of the eNB 200 includes a transport format of an uplink and a downlink (for example, a transport block size, and a modulation and coding scheme) and a MAC scheduler for determining a resource block.

The RLC layer transmits data to an RLC layer of a reception side by using the functions of the MAC layer and the PHY layer. Between the RLC layer of the UE 100 and the RLC layer of the eNB 200, data is transmitted through a logical channel.

The PDCP layer performs header compression and extension, and encryption and decryption.

The RRC layer is defined only in a control plane. Between the RRC layer of the UE 100 and the RRC layer of the eNB 200, data is transmitted through a radio bearer. The RRC layer controls the logical channel, the transport channel, and the physical channel in response to establishment, re-establishment, and release of the radio bearer. When there is an RRC connection between RRC of the UE 100 and RRC of the eNB 200, the UE 100 is in an RRC connected state. Otherwise, the UE 100 is in an RRC idle state.

A NAS (Non-Access Stratum) layer positioned above the RRC layer performs session management, mobility management and the like.

Figure 5:
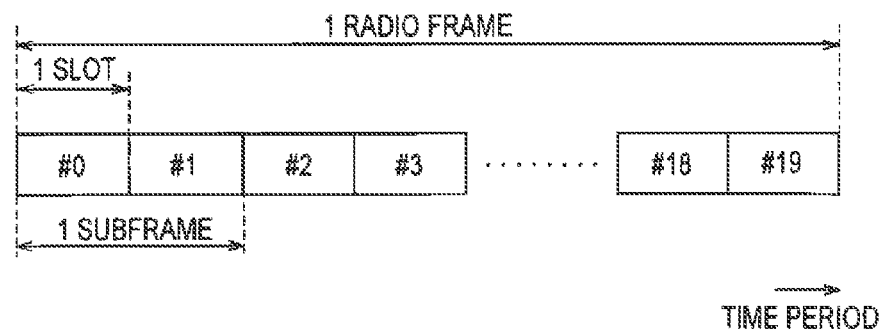
FIG. 5 is a configuration diagram of a radio frame used in the LTE system.

FIG. 5 is a configuration diagram of a radio frame used in the LTE system. In the LTE system, OFDMA (Orthogonal Frequency Division Multiplexing Access) is employed in a downlink, and SC-FDMA (Single Carrier Frequency Division Multiple Access) is employed in an uplink, respectively.

As illustrated in FIG. 5, the radio frame includes 10 subframes arranged in a time-period direction, wherein each subframe includes two slots arranged in the time-period direction. Each subframe has a length of 1 ms and each slot has a length of 0.5 ms. Each subframe includes a plurality of resource blocks (RBs) in a frequency direction, and a plurality of symbols in the time-period direction. The resource block includes a plurality of continuous subcarriers. Furthermore, each symbol is provided at a head thereof with a guard interval called a cyclic prefix (CP).

In the downlink, an interval of several symbols at the head of each subframe is a control region mainly used as a physical downlink control channel (PDCCH) that carries a control signal. The control signal, for example, includes uplink SI (Scheduling Information), downlink SI (Scheduling Information), and a TPC bit. The uplink SI is a signal that indicates the assignment of an uplink resource block. The downlink SI is a signal that indicates the assignment of a downlink resource block. The TPC bit is a signal that indicates increase and decrease in power of a signal that is transmitted through the uplink channel. Furthermore, the remaining interval of each subframe is a region mainly used as a physical downlink shared channel (PDSCH) that carries user data.

In the uplink, both end portions in the frequency direction of each subframe are control regions mainly used as a physical uplink control channel (PUCCH) that carries a control signal. The control signal, for example, includes CQI (Channel Quality Indicator), PMI (Precoding Matrix Indicator), RI (Rank Indicator), SR (Scheduling Request), and ACK/NACK. The CQI is a signal that notifies a recommended modulation scheme and an encoding rate to be used in downlink transmission. The PMI is a signal that indicates a precoder matrix preferably used for the downlink transmission. The RI is a signal that indicates the number of layers (the number of streams) to be used in the downlink transmission. The SR is a signal that requests the assignment of the uplink resource block. The ACK/NACK is a signal that indicates whether it is possible to receive user data that is transmitted via the downlink channel (for example, PDSCH). Furthermore, the center portion in the frequency direction of each subframe is a region mainly used as a physical uplink shared channel (PUSCH) that carries user data.

(1.3) Overview of Carrier Aggregation

Hereinafter, a description will be provided for the carrier configuration in the carrier aggregation supported by the LTE system according to the present embodiment. Carrier aggregation in the downlink will be described as an example. However, the present invention is not limited to the downlink.

Figure 6:
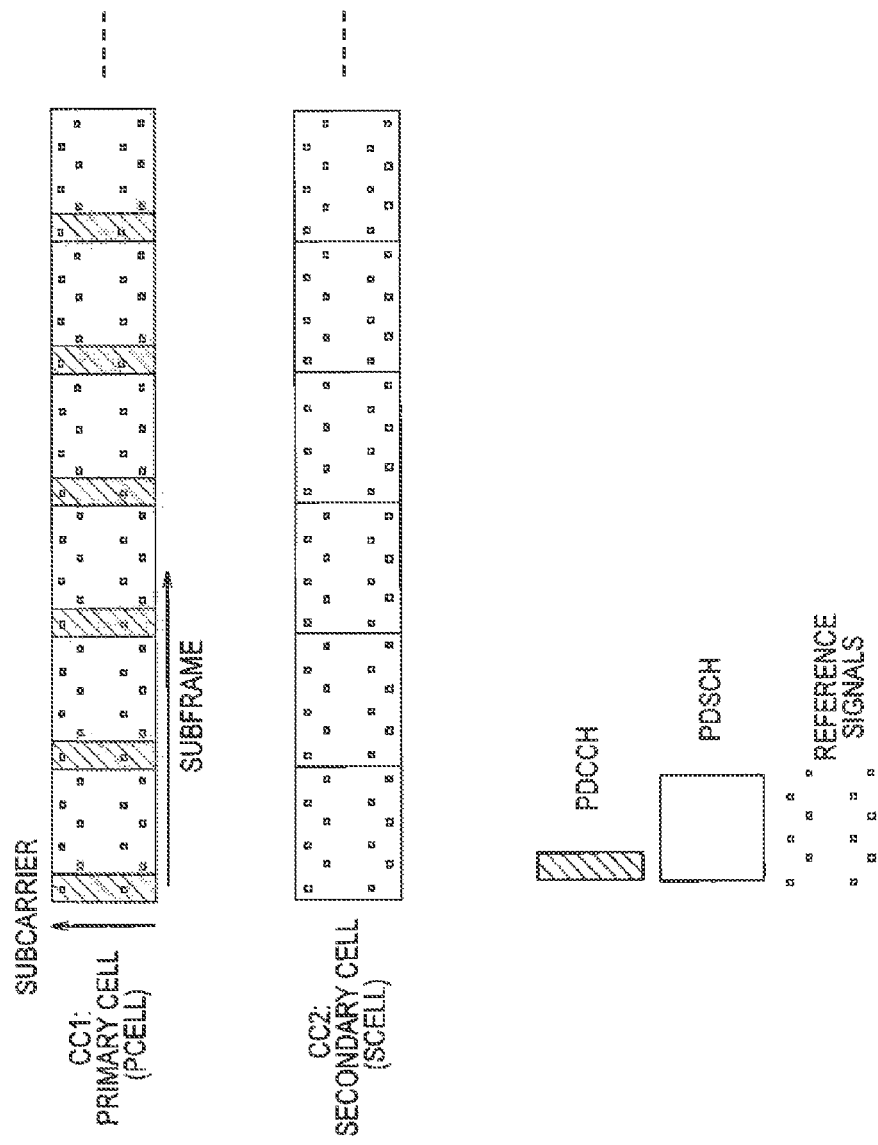
FIG. 6 is a configuration diagram of the radio frame when carrier aggregation is applied in a downlink.

FIG. 6 is a configuration diagram of a radio frame when the carrier aggregation in the downlink is applied. Furthermore, FIG. 6 illustrates the case in which two component carriers (CCs) are available in the downlink. The two component carriers (CC1 and CC2) may be continuous in the frequency direction or may not be continuous.

As illustrated in FIG. 6, the LTE system according to the present embodiment supports carrier aggregation in which multicarrier communication is performed by using the first component carrier (CC1) operated as the primary cell and the second component carrier (CC2) operated as the secondary cell.

In the first component carrier (CC1) operated as the primary cell, each subframe includes a control region (a PDCCH region) used as the PDCCH and a control region (a PDSCH region) used as the PDSCH. Furthermore, each subframe includes reference signals.

In this way, the subframe in the first component carrier (CC1) includes the PDCCH region and the PDSCH region, and is able to transmit a control signal and user data. Consequently, the primary cell (the first component carrier) is able to singly accommodate a user terminal because it is possible to transmit the control signal.

On the other hand, in the second component carrier (CC2) operated as the secondary cell, each subframe includes a data region (a PDSCH region) used as the PDSCH, instead of the control region (the PDCCH region) used as the PDCCH. Furthermore, each subframe includes reference signals.

As described above, since the subframe in the second component carrier (CC2) does not include the PDCCH region, it is not able to transmit the control signal. Consequently, the secondary cell (the second component carrier) is not able to singly accommodate a user terminal because it is not possible to transmit the control signal.

(1.4) Operation According to First Embodiment

Hereinafter, the operation of the LTE system according to the present embodiment will be described.

Figure 7:
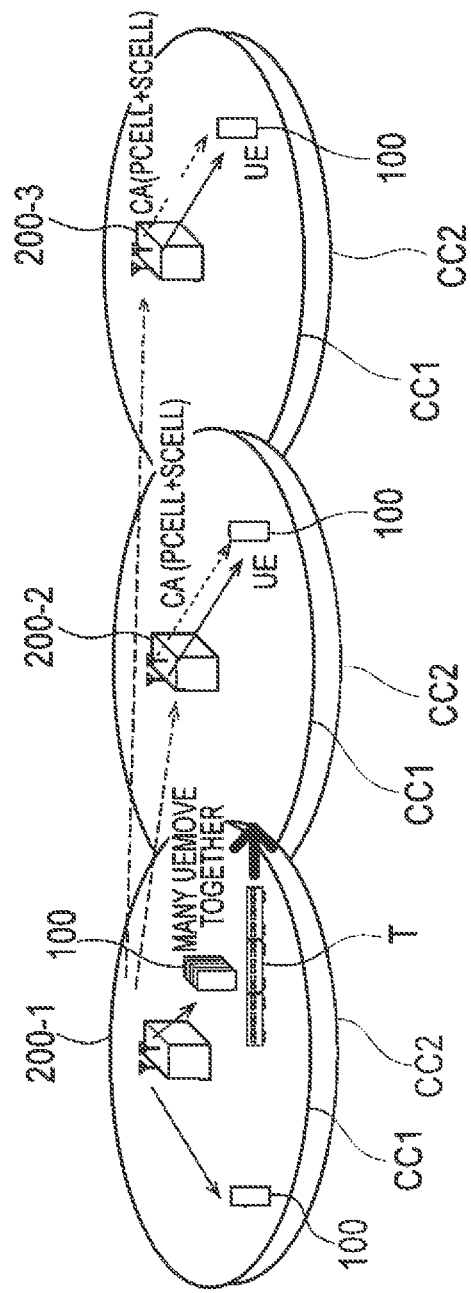
FIG. 7 is a diagram for explaining an operating environment of the LTE system according to a first embodiment and a second embodiment.

FIG. 7 is a diagram for explaining an operating environment of the LTE system considered in the present embodiment. As illustrated in FIG. 7, eNB 200-2 is installed adjacent to eNB 200-1 and eNB 200-3 is installed adjacent to the eNB 200-2.

Each of the eNB 200-1, the eNB 200-2, and the eNB 200-3 supports the carrier aggregation. In the present embodiment, each of the eNB 200-1, the eNB 200-2, and the eNB 200-3 is able to use the first component carrier (CC1) and the second component carrier (CC2).

Furthermore, within a communication area of each of the eNB 200-1, the eNB 200-2, and the eNB 200-3, a movement path (for example, a line) of a transportation traffic means T such as a train is provided. The transportation traffic means T passes through a corresponding communication area in the sequence of the eNB 200-1, the eNB 200-2, and the eNB 200-3.

The transportation traffic means T may have a number of UEs 100 therein. In the case in which the number of UEs 100 exist in the transportation traffic means T, when the transportation traffic means T passes through the communication area, a load level of the eNB 200 corresponding to the communication area rapidly increases.

In the present embodiment, each of the eNB 200-1, the eNB 200-2, and the eNB 200-3 normally operates in a mode (hereafter, a carrier aggregation mode) in which the carrier aggregation is performed. Meanwhile, each of the eNB 200-1, the eNB 200-2, and the eNB 200-3 operates in a mode (hereafter, a multi-UE mode), in which the carrier aggregation is not performed, in the situation in which a load level is high and the situation in which the load level is estimated to be increased.

In the multi-UE mode, a transmission speed per one UE is reduced as compared with the carrier aggregation mode, but it is possible to increase the number of UEs which can be accommodated by the eNB 200.

Figure 8:
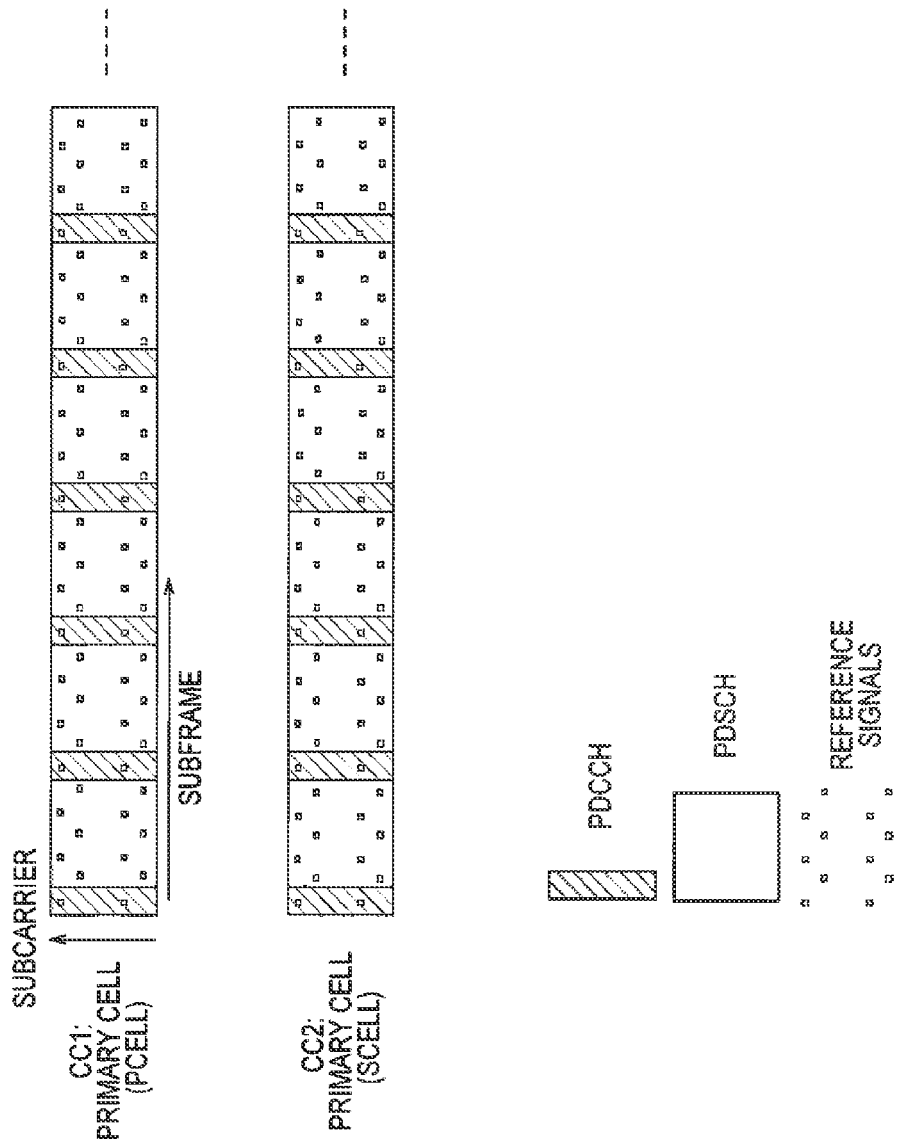
FIG. 8 is a configuration diagram of the radio frame in a multi-UE mode according to the first embodiment to a third embodiment.

FIG. 8 is a configuration diagram of a radio frame when the carrier aggregation in the downlink is not applied (that is, in the multi-UE mode).

As illustrated in FIG. 8, in the multi-UE mode, the second component carrier (CC2) is operated as the primary cell similarly to the first component carrier. Specifically, in the second component carrier (CC2) operated as the primary cell, each subframe includes the control region (the PDCCH region) used as the PDCCH and the control region (the PDSCH region) used as the PDSCH. Furthermore, each subframe includes reference signals.

In the example in FIG. 7, since the transportation traffic means T exists in the communication area of the eNB 200-1 and a load level of the eNB 200-1 is high, the eNB 200-1 operates in the multi-UE mode. Furthermore, in response to the fact that the load level of the eNB 200-1 is high, the eNB 200-1 transmits a notification message (hereinafter, a "Traffic Forecast message A") regarding the load level of the eNB 200-1 to the eNB 200-2 on an X2 interface or an S1 interface. In the present embodiment, the Traffic Forecast message A corresponds to neighbor base station information.

When the Traffic Forecast message A is received, the eNB 200-2 shifts to the multi-UE mode on the basis of the Traffic Forecast message A. Specifically, the eNB 200-2 changes the carrier configuration of the second component carrier (CC2) such that the second component carrier (CC2) is operated as the primary cell.

As described above, when an increase in the number of UEs to be connected to the eNB 200-2 is estimated from the Traffic Forecast message A, the eNB 200-2 changes the carrier configuration such that the second component carrier (CC2) is operated as the primary cell, in preparation for the increase in the number of UEs to be connected. In this way, when the number of UEs to be connected to the eNB 200-2 is actually increased, the eNB 200-2 is able to cover the increase in the number of UEs to be connected, by using the primary cell corresponding to the second component carrier (CC2).

When it is estimated that a load level of the eNB 200-3 is also increased, the eNB 200-1 transmits the Traffic Forecast message A to the eNB 200-3 on the X2 interface or the S1 interface.

In addition, a list of eNBs (cells), which are set to be a transmission destination of the Traffic Forecast message A by the eNB 200-1, may be held by the eNB 200-1 or an upper network entity.

Figure 9:
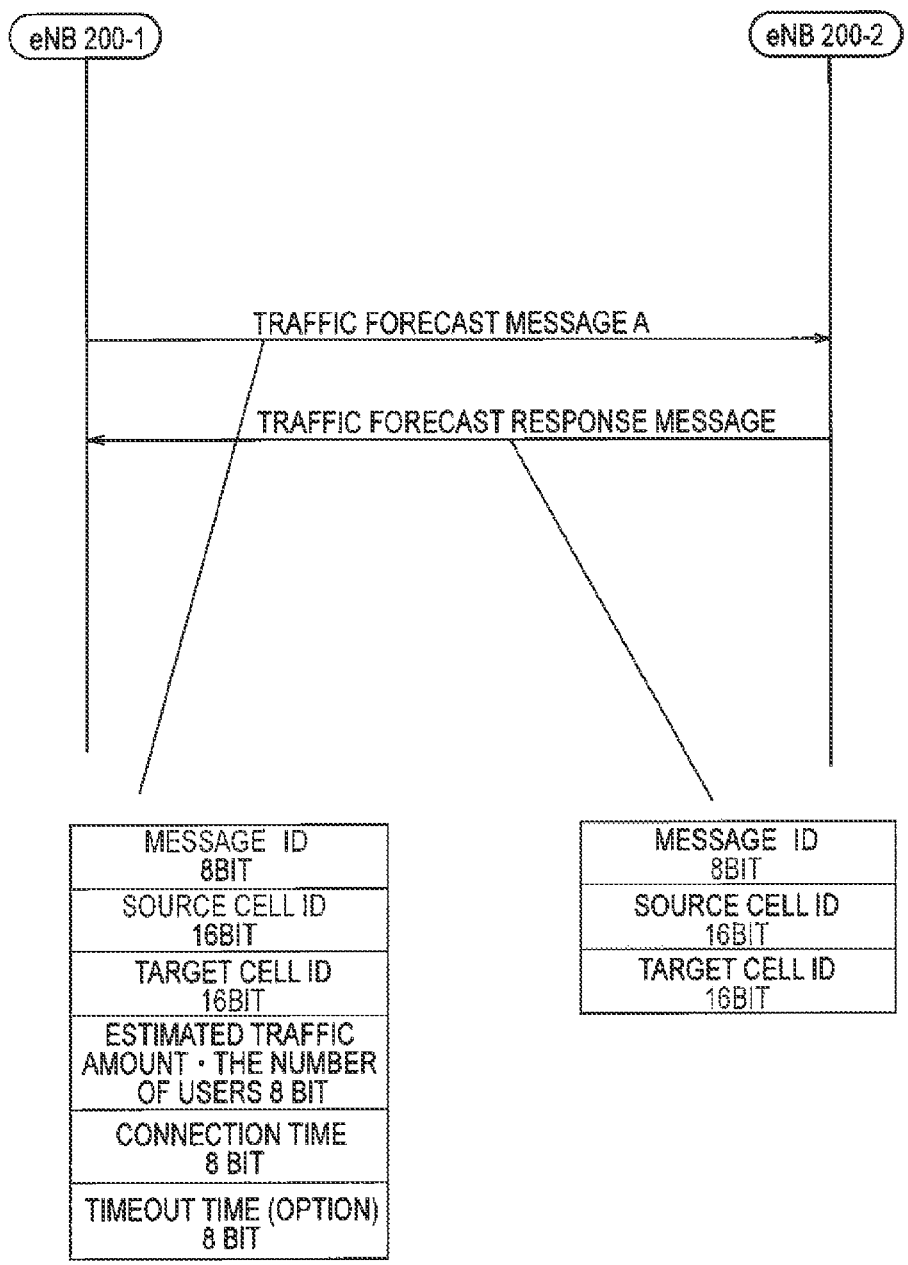
FIG. 9 is a diagram for explaining a message configuration regarding a Traffic Forecast message A according to the first embodiment.

FIG. 9 is a diagram for explaining a message configuration regarding the Traffic Forecast message A according to the present embodiment. Hereinafter, a description will be provided for an example in which the Traffic Forecast message A is transmitted from the eNB 200-1 to the eNB 200-2.

As illustrated in FIG. 9, the Traffic Forecast message A includes a message ID for identifying a message type, a cell ID for identifying a transmission source, and a cell ID for identifying a transmission destination.

Furthermore, the Traffic Forecast message A includes load information indicating a load level (for example, the number of UEs to be connected or a traffic amount) estimated to be increased in the eNB 200-2. The load level estimated to be increased in the eNB 200-2 may include a load level of the eNB 200-1 increased when the transportation traffic means T enters the communication area of the eNB 200-1. Alternatively, the load information may include information indicating a load level of the eNB 200-1 at the present time point.

Moreover, the Traffic Forecast message A includes duration time information indicating a time period during which the load level of the eNB 200-1 is continued in a high state. Specifically, the eNB 200-1 counts a passage time (a duration time) from the time point at which the load level thereof has exceeded a predetermined level, and puts duration time information indicating a passage time at a transmission time point into the Traffic Forecast message A when transmitting the Traffic Forecast message A. The duration time information is used when the eNB 200-2 determines the timing for changing the second component carrier (CC2) to the primary cell.

In addition, the Traffic Forecast message A may include timeout time information indicating a timeout time to be compared with the duration time. In this case, on the basis of the duration time information and the timeout time information included in the Traffic Forecast message A, the eNB 200-2 determines whether the duration time exceeds the timeout time and shifts to the multi-UE mode at the timing at which the duration time exceeds the timeout time.

Meanwhile, a Traffic Forecast Response message, which is a response for the Traffic Forecast message A, includes a message ID for identifying a message type, a cell ID for identifying a transmission source, and a cell ID for identifying a transmission destination.

FIG. 10 is an operation flow diagram of the eNB 200-1 according to the present embodiment. Hereinafter, a description will be provided for the operation of the eNB 200-1 regarding the transmission of the Traffic Forecast message A to the eNB 200-2.

As illustrated in FIG. 10, in step S111, the eNB 200-1 determines whether the load level thereof exceeds a predetermined level. When the load level of the eNB 200-1 exceeds the predetermined level, the eNB 200-1 activates a duration time timer for counting a duration time.

When the determination in step S111 is "YES", the eNB 200-1 acquires load information and duration time information in step S112. The load information may include the load level of the eNB 200-1 increased when the transportation traffic means T enters the communication area of the eNB 200-1. Alternatively, the load information may include information indicating a load level of the eNB 200-1 at the present time point. The duration time information may include a value of the duration time timer.

In step S113, the eNB 200-1 transmits a Traffic Forecast message A including the load information and the duration time information acquired in step S112 to the eNB 200-2 on the X2 interface or the S1 interface.

FIG. 11 is an operation flow diagram of the eNB 200-2 according to the present embodiment.

As illustrated in FIG. 11, in step S121, the eNB 200-2 determines whether the Traffic Forecast message A has been received.

When the determination in step S121 is "YES", the eNB 200-2 determines whether the sum of the load level thereof and a load level indicated by a load state included in the received Traffic Forecast message A exceeds a predetermined level in step S122. Alternatively, the eNB 200-2 may determine whether the load level indicated by the load state included in the received Traffic Forecast message A exceeds the predetermined level.

When the determination in step S122 is "YES", the eNB 200-2 determines whether the duration time indicated by the duration time information included in the received Traffic Forecast message A exceeds a timeout time in step S123. When information indicating the timeout time is included in the received Traffic Forecast message A, the timeout time may be set from the information. Alternatively, the timeout time may be set in advance on the basis of a peripheral environment of the eNB 200-2.

When the determination in step S123 is "YES", the eNB 200-2 changes the carrier configuration such that the second component carrier (CC2) is operated as the primary cell. That is, the eNB 200-2 shifts to the multi-UE mode from the CA mode.

In addition, the eNB 200-2 may transmit a positive acknowledgment (ACK) as the aforementioned Traffic Forecast Response message when shifting to the multi-UE mode, and transmit a negative acknowledgement (NACK) as the aforementioned Traffic Forecast Response message when not shifting to the multi-UE mode.

(1.5) Conclusion

According to the present embodiment, when an increase in the load level of the eNB 200-2 is estimated from the Traffic Forecast message A, the eNB 200-2 is able to change the setting such that the second component carrier (CC2) is operated as the primary cell in preparation for the increase in the load level (that is, the eNB 200-2 switches to the multi-UE mode from the CA mode). Thus, when the load level of the eNB 200-2 is actually increased, the eNB 200-2 is able to cover the increase in the load level by using the second component carrier (CC2) for which the setting to the primary cell is changed.

The Traffic Forecast message A according to the present embodiment includes the duration time information indicating the duration time of the state in which the load level of the eNB 200-1 exceeds the predetermined level. In this way, the eNB 200-2 is able to estimate the timing at which the load level thereof increases from the duration time information, and to appropriately determine the timing for changing the setting of the second component carrier (CC2).

(1.6) Modification of First Embodiment

In the first embodiment, the switching from the CA mode to the multi-UE mode is controlled by using the Traffic Forecast message A that is a new message. However, instead of the Traffic Forecast message A, an existing message may be used. Specifically, the sequence in FIG. 9 may be modified as follows.

Firstly, the eNB 200-2 transmits a Resource Status Request message for requesting a report of a situation of a load level (a resource use situation) to the eNB 200-1 on the X2 interface. The Resource Status Request message includes information for designating a report cycle.

Secondly, in response to the Resource Status Request message from the eNB 200-2, the eNB 200-1 periodically transmits a Resource Status Update message including information indicating the situation of the load level (the resource use situation) to the eNB 200-2 on the X2 interface.

Thirdly, on the basis of the Resource Status Request message from the eNB 200-2, the eNB 200-2 changes such that the second component carrier (CC2) is operated as the primary cell (that is, the eNB 200-2 switches to the multi-UE mode from the CA mode).

(2) Second Embodiment

Hereinafter, the second embodiment will be described while focusing on differences from the first embodiment. The second embodiment is different from the first embodiment in that it is the eNB 200 at a message transmission side that determines the switching from the CA mode to the multi-UE mode.

(2.1) Overview of Second Embodiment

A communication control method according to the present embodiment includes a step A of transmitting, by a base station, a request message, which requests a change such that the second component carrier is operated as a primary cell, to a neighboring base station on the basis of the load level of the base station.

Furthermore, the "transmitting the request message" includes the case of indirectly transmitting the request message to the neighboring base station via an upper network entity as well as the case of directly transmitting the request message to the neighboring base station. The "neighboring base station" may be a concept including a next neighboring base station.

Furthermore, the "changing the second component carrier" includes the case of changing the carrier configuration such that only a part of the secondary component carriers is operated as the primary cell as well as the case of changing the carrier configuration such that all the secondary component carriers are operated as the primary cell. In the former case, the carrier aggregation is stopped, but in the latter case, the carrier aggregation is partially continued.

In addition, the "operating only a part of the secondary component carriers as the primary cell" includes operating a part of subframes of one secondary component carrier as the primary cell when there is one secondary component carrier, and operating one of a plurality of secondary component carriers as the primary cell when there are the plurality of secondary component carriers.

According to the communication control method of the present embodiment, when an increase in the load level of the neighboring base station is estimated from the load level of the base station (for example, it is estimated that the number of user terminals accommodated by the neighboring base station is increased), the base station is able to change the operation of the second component carrier in the neighboring base station to the primary cell in preparation for the increase in the load level.

Thus, when the load level of the neighboring base station is actually increased, the neighboring base station is able to cover the increase in the load level by using the second component carriers for which the setting to the primary cell is changed. Consequently, in accordance with the communication control method according to the second embodiment, it is possible to appropriately operate a plurality of component carriers.

The communication control method according to the present embodiment may further include a step B of determining, by the base station, a timing for transmitting the request message on the basis of a duration time of a state in which the load level of the base station exceeds a predetermined level. As a result, the base station uses the duration time so as to estimate the timing at which the load level of the neighboring base station increases, and the base station becomes able to appropriately determine the timing for transmitting the request message.

(2.2) Operation According to Second Embodiment

An operating environment of an LTE system considered in the present embodiment is equal to that in the first embodiment (FIG. 7).

In the present embodiment, in the example in FIG. 7, since the transportation traffic means T exists in the communication area of the eNB 200-1 and the load level of the eNB 200-1 is high, the eNB 200-1 operates in the multi-UE mode. Furthermore, in response to the fact that the load level of the eNB 200-1 is high, the eNB 200-1 transmits a request message (hereinafter, a "Traffic Forecast message B") for requesting a change such that the second component carrier (CC2) is operated as the primary cell to the eNB 200-2 on the X2 interface or the S1 interface. In the present embodiment, the Traffic Forecast message B corresponds to neighbor base station information.

When the Traffic Forecast message B is received, the eNB 200-2 shifts to the multi-UE mode on the basis of the Traffic Forecast message B. Specifically, the eNB 200-2 changes the carrier configuration of the second component carrier (CC2) such that the second component carrier (CC2) is operated as the primary cell.

As described above, when an increase in the load level of the eNB 200-2 is estimated from the load level of the eNB 200-1, the eNB 200-1 is able to change the operation of the second component carrier in the eNB 200-2 to the primary cell in preparation for the increase in the load level. Thus, when the load level of the eNB 200-2 is actually increased, the eNB 200-2 is able to cover the increase in the load level by using the additional primary cell.

When it is estimated that a load level of the eNB 200-3 is also increased, the eNB 200-1 transmits the Traffic Forecast message B to the eNB 200-3 on the X2 interface or the S1 interface.

In addition, a list of eNBs (cells), which are set to be a transmission destination of the Traffic Forecast message B by the eNB 200-1, may be held by the eNB 200-1 or an upper network entity.

FIG. 12 is a diagram for explaining a message configuration regarding the Traffic Forecast message B according to the present embodiment. Hereinafter, a description will be provided for an example in which the Traffic Forecast message B is transmitted from the eNB 200-1 to the eNB 200-2.

As illustrated in FIG. 12, the Traffic Forecast message B includes a message ID for identifying a message type, a cell ID for identifying a transmission source, and a cell ID for identifying a transmission destination.

A Traffic Forecast Response message, which is a response for the Traffic Forecast message B, includes a message ID for identifying a message type, a cell ID for identifying a transmission source, and a cell ID for identifying a transmission destination.

FIG. 13 is an operation flow diagram of the eNB 200-1 according to the present embodiment. Hereinafter, a description will be provided for the operation of the eNB 200-1 regarding the transmission of the Traffic Forecast message B to the eNB 200-2.

As illustrated in FIG. 13, in step S211, the eNB 200-1 determines whether the load level thereof exceeds a predetermined level. When the load level of the eNB 200-1 exceeds the predetermined level, the eNB 200-1 activates a duration time timer for counting a duration time.

When the determination in step S211 is "YES", the eNB 200-1 determines whether the duration time indicated by the duration time timer exceeds a timeout time in step S212. The timeout time is set in advance on the basis of a peripheral environment of the eNB 200-2.

When the determination in step S212 is "YES", the eNB 200-1 transmits the Traffic Forecast message B for requesting a change such that the second component carrier (CC2) is operated as the primary cell to the eNB 200-2 on the X2 interface or the S1 interface, in step S213.

FIG. 14 is an operation flow diagram of the eNB 200-2 according to the present embodiment.

As illustrated in FIG. 14, in step S221, the eNB 200-2 determines whether the Traffic Forecast message B has been received.

When the determination in step S221 is "YES", the eNB 200-2 changes the setting such that the second component carrier (CC2) is operated as the primary cell in step S222. That is, the eNB 200-2 shifts to the multi-UE mode from the CA mode.

In addition, the eNB 200-2 may transmit a positive acknowledgement (ACK) as the aforementioned Traffic Forecast Response message when shifting to the multi-UE mode, and transmit a negative acknowledgement (NACK) as the aforementioned Traffic Forecast Response message when not shifting to the multi-UE mode due to a certain reason.

(2.3) Conclusion

According to the present embodiment, when an increase in the load level of the eNB 200-2 is estimated from the load level of the eNB 200-1, the eNB 200-1 is able to change the operation of the second component carrier in the eNB 200-2 to the primary cell in preparation for the increase in the load level. Thus, when the load level of the eNB 200-2 is actually increased, the eNB 200-2 is able to cover the increase in the load level by using the additional primary cell.

In the present embodiment, the eNB 200-1 determines a timing for transmitting the Traffic Forecast message on the basis of a duration time of a state in which the load level of the eNB 200-1 exceeds a threshold value. In this way, the eNB 200-1 uses the duration time so as to estimate the timing at which the load level of the eNB 200-2 increases, and the eNB 200-1 becomes able to appropriately determine the timing for transmitting the Traffic Forecast message.

(3) Third Embodiment

Hereinafter, the third embodiment will be described on the basis of a difference from the first embodiment and the second embodiment. The first embodiment and the second embodiment are embodiments regarding the switching (shifting) to the multi-UE mode from the CA mode. However, the third embodiment is an embodiment regarding switching (returning) to the CA mode from the multi-UE mode.

(3.1) Overview of Third Embodiment

A communication control method according to the present embodiment includes a step A of changing, by a base station, the carrier configuration of the second component carrier such that the second component carrier is operated as the primary cell, and returning the carrier configuration of the second component carrier to the state before changing the setting, on the basis of a load level of the base station.

As described above, after changing the carrier configuration such that the second component carrier is operated as the primary cell, when the load level of the base station is sufficiently reduced, the base station returns to the state before changing the setting (that is, returns the second component carrier to the secondary cell), thereby reliably performing carrier aggregation. Consequently, in accordance with the communication control method according to the third embodiment, it is possible to appropriately operate a plurality of component carriers.

The step A may include a step A1 of instructing, by the base station, a user terminal that establishes a connection by using the second component carrier to perform handover to the first component carrier before returning the carrier configuration of the second component carrier to the state before changing the setting.

Alternatively, the step A may also include a step A2 of adjusting, by the base station, a handover threshold value to promote handover to the first component carrier or another base station before returning the carrier configuration of the second component carrier to the state before changing the setting.

Alternatively, the step A may also include a step A3 of reducing, by the base station, transmission power in the second component carrier to promote handover to the first component carrier or another base station before returning the carrier configuration of the second component carrier to the state before changing the setting.

In this way, even in the case of returning the setting of the second component carrier to the state (the secondary cell) before changing the setting, it is possible to avoid the case in which communication of a user terminal that establishes a connection by using the second component carrier being operated as the primary cell is interrupted.

(3.2) Operation According to Third Embodiment

FIG. 15 is a diagram for explaining an operating environment of the LTE system considered in the present embodiment.

As illustrated in FIG. 15(a), the eNB 200-2 is installed adjacent to the eNB 200-1 and the eNB 200-3 is installed adjacent to the eNB 200-2. Within a communication area of each of the eNB 200-1, the eNB 200-2, and the eNB 200-3, a movement path (for example, a line) of the transportation traffic means T such as a train is provided. The transportation traffic means T passes through a corresponding communication area in the sequence of the eNB 200-1, the eNB 200-2, and the eNB 200-3.

The transportation traffic means T may have a number of UEs 100 therein. In the case in which the number of UEs 100 exist in the transportation traffic means T, when the transportation traffic means T passes through the communication area, a load level of the eNB 200 corresponding to the communication area rapidly increases.

In the example in FIG. 15(a), since the transportation traffic means T exists in the communication area of the eNB 200-1 and the load level of the eNB 200-1 is high, the eNB 200-1 operates in the multi-UE mode. Furthermore, in response to the fact that the load level of the eNB 200-1 is high, the eNB 200-1 transmits the Traffic Forecast message A or the Traffic Forecast message B to the eNB 200-2 on the X2 interface or the S1 interface.

As illustrated in FIG. 15(b), after the Traffic Forecast message A or the Traffic Forecast message B is received, since the transportation traffic means T exists in the communication area of the eNB 200-2 and the load level of the eNB 200-2 is high, the eNB 200-2 operates in the multi-UE mode. Furthermore, in response to the fact that the load level of the eNB 200-2 is high, the eNB 200-2 transmits the Traffic Forecast message A or the Traffic Forecast message B to the eNB 200-3 on the X2 interface or the S1 interface. Meanwhile, since there is no transportation traffic means T in the communication area of the eNB 200-1 and the load level of the eNB 200-1 is low, the eNB 200-1 returns to the CA mode from the multi-UE mode.

As illustrated in FIG. 15(c), after the Traffic Forecast message A or the Traffic Forecast message B is received, since the transportation traffic means T exists in the communication area of the eNB 200-3 and the load level of the eNB 200-3 is high, the eNB 200-3 operates in the multi-UE mode. Meanwhile, since there is no transportation traffic means T in the communication area of the eNB 200-2 and the load level of the eNB 200-2 is low, the eNB 200-2 returns to the CA mode from the multi-UE mode.

Next, with reference to FIG. 6 and FIG. 8, a description will be provided for the overview of an operation when returning to the CA mode from the multi-UE mode.

As illustrated in FIG. 8, in the multi-UE mode, since both the first component carrier (CC1) and the second component carrier (CC2) are operated as the primary cell, the second component carrier (CC2) is able to singly accommodate the UE 100 (that is, the UE 100 is able to establish a connection).

However, as illustrated in FIG. 6, in the CA mode, since the second component carrier (CC2) is operated as the secondary cell, the second component carrier (CC2) is not able to singly accommodate the UE 100 (that is, the UE 100 is not able to establish a connection).

Thus, when the multi-UE mode is switched to the CA mode, since the UE 100 that establishes the connection by using the second component carrier (CC2) is not able to maintain the connection, the UE 100 shifts to an idle state from the connected state. That is, the communication of the UE 100 that establishes the connection by using the second component carrier (CC2) is interrupted.

In this regard, in the present embodiment, before switching to the CA mode from the multi-UE mode, the eNB 200 controls the UE 100 that establishes the connection by using the second component carrier (CC2) to perform handover to the first component carrier (CC1) or another eNB 200.

As described above, when the UE 100 that establishes the connection by using the second component carrier (CC2) is handed over to the first component carrier (CC1) or another eNB 200, the UE 100 becomes able to maintain the connected state even though the multi-UE mode is switched to the CA mode, and as a result, the communication of the UE 100 is not interrupted. Furthermore, methods for performing the handover, for example, are three as follows.

According to the first method, before returning the carrier configuration of the second component carrier (CC2) to the state (the secondary cell) before changing the carrier configuration, the eNB 200 instructs the UE 100 that establishes the connection by using the second component carrier (CC2) to perform handover to the first component carrier (CC1).

According to the second method, before returning the carrier configuration of the second component carrier (CC2) to the state (the secondary cell) before changing the carrier configuration, the eNB 200 adjusts the handover threshold value to promote handover to the first component carrier (CC1) or another eNB 200. The handover threshold value is a threshold value that is compared with received power or reception quality of a reference signal in the UE 100. For example, the UE 100 adjusts the handover threshold value, which is compared with received power or reception quality of a reference signal received in the UE 100 by using the first component carrier (CC1), to be small, so that it is possible to promote handover to the first component carrier (CC1). Alternatively, the UE 100 adjusts the handover threshold value, which is compared with received power or reception quality of a reference signal received in the UE 100 by using the second component carrier (CC2), to be large, so that it is possible to promote handover from the second component carrier (CC2).

According to the third method, before returning the carrier configuration of the second component carrier (CC2) to the state (the secondary cell) before changing the carrier configuration, the eNB 200 reduces transmission power in the second component carrier (CC2) to promote handover to the first component carrier (CC1) or another eNB 200. In this way, the received power or the reception quality of the reference signal received in the UE 100 by using the first component carrier (CC1) is low, so that it is possible to promote handover from the second component carrier (CC2).

Then, through at least one of the first method to the third method, the eNB 200 returns the carrier configuration of the second component carrier (CC2) to the state (the secondary cell) before changing the carrier configuration after there is no UE 100 that establishes the connection by using the second component carrier (CC2). In addition, in the case of the second method and the third method, when completing such a returning operation, it is preferable that the handover threshold value and the transmission power also return to the original values.

Figure 16:
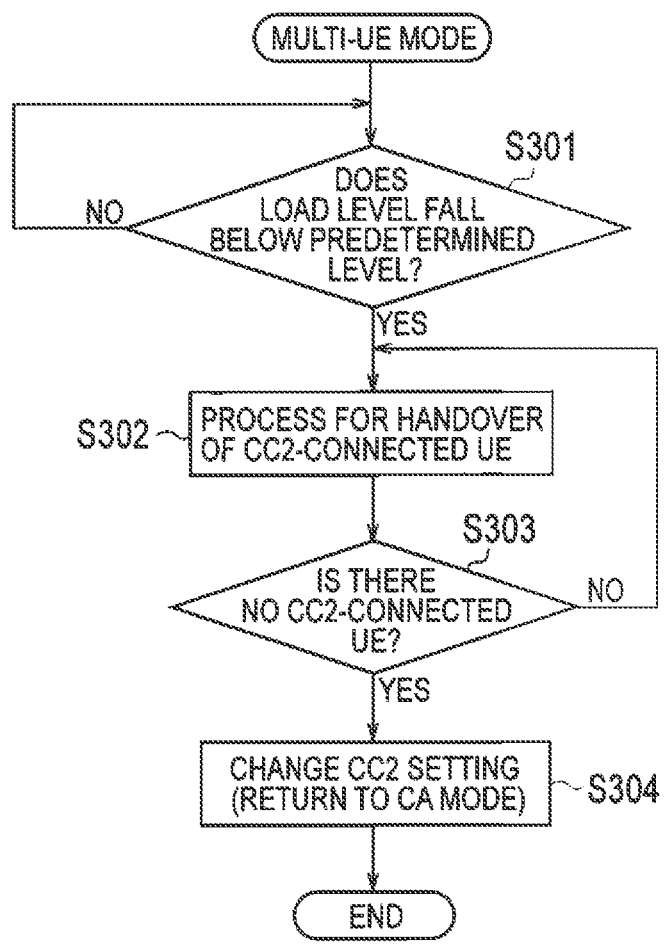
FIG. 16 is an operation flow diagram of the eNB according to the third embodiment.

FIG. 16 is an operation flow diagram of the eNB 200 according to the present embodiment. In an initial state of the present flow, the eNB 200 is assumed to operate in the multi-UE mode.

As illustrated in FIG. 16, in step S301, the eNB 200 determines whether the load level thereof falls below a predetermined level.

When the determination in step S301 is "YES", the eNB 200 starts a process of allowing UEs 100 that establish a connection by using the second component carrier (CC2) to perform handover to the first component carrier (CC1) or another eNB 200, that is, starts at least one of the aforementioned first method to third method, in step S302.

In step S303, the eNB 200 determines whether all UEs 100 that establish a connection by using the second component carrier (CC2) performed handover.

When the determination in step S303 is "YES", the eNB 200 returns the carrier configuration of the second component carrier (CC2) to the state (the secondary cell) before changing the carrier configuration in step S304. As a consequence, the eNB 200 returns to the CA mode from the multi-UE mode.

(3.3) Conclusion

According to the present embodiment, after changing the carrier configuration such that the second component carrier (CC2) is operated as the primary cell, when the load level of the eNB 200 is sufficiently reduced, the eNB 200 returns to the state (the secondary cell) before changing the carrier configuration of the second component carrier (CC2), thereby reliably performing carrier aggregation.

In the present embodiment, before returning the carrier configuration of the second component carrier (CC2) to the state before changing the carrier configuration, the eNB 200 instructs the UE 100 that establishes the connection by using the second component carrier (CC2) to perform handover to the first component carrier (CC1).

Alternatively, before returning the carrier configuration of the secondary cell to the state before changing the carrier configuration, the eNB 200 at least one of adjusts the handover threshold value and reduces the transmission power in the second component carrier (CC2) to promote handover to the first component carrier (CC1) or another eNB 200.

In this way, even in the case of returning the carrier configuration of the second component carrier (CC2) to the state before changing the carrier configuration, it is possible to avoid the case in which the communication of the UE 100 that establishes the connection by using the second component carrier (CC2) is interrupted.

(4) Fourth Embodiment

Hereinafter, the fourth embodiment will be described on the basis of a difference from the first embodiment to the third embodiment.

(4.1) NCT

The fourth embodiment relates to the LTE system that support the NCT.

In the LTE system that support the NCT, all UEs 100 do not always support the NCT. Some UEs 100 only support LCT without supporting the NCT.

A carrier (NCT carrier) adopting the NCT can only accommodate user terminals supporting NCT. On the other hand, A carrier (LCT carrier) adopting the LCT can accommodate both user terminals not supporting NCT and user terminals supporting NCT.

(4.1.1) Illustrative Example 1 of NCT

Figure 17:
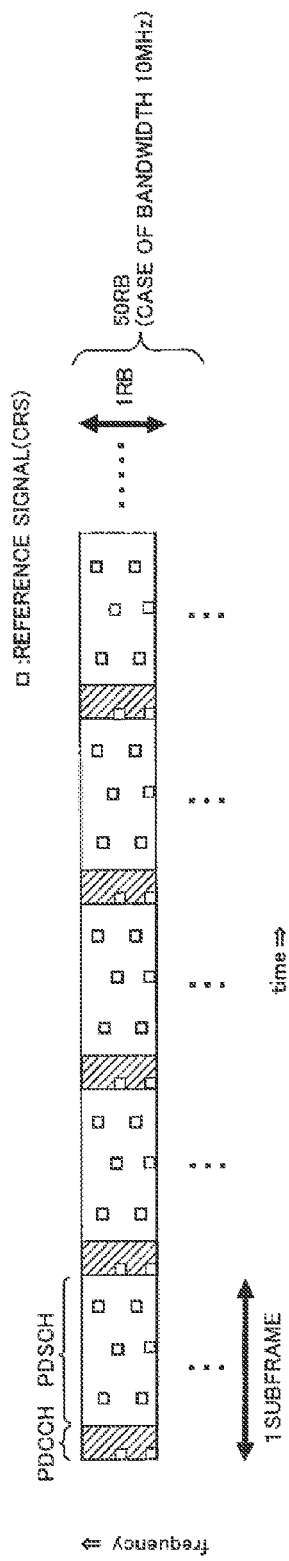
FIG. 17 is a diagram for explaining an illustrative example 1 of NCT and shows the carrier configuration of LCT carrier as a comparative example.
Figure 18:
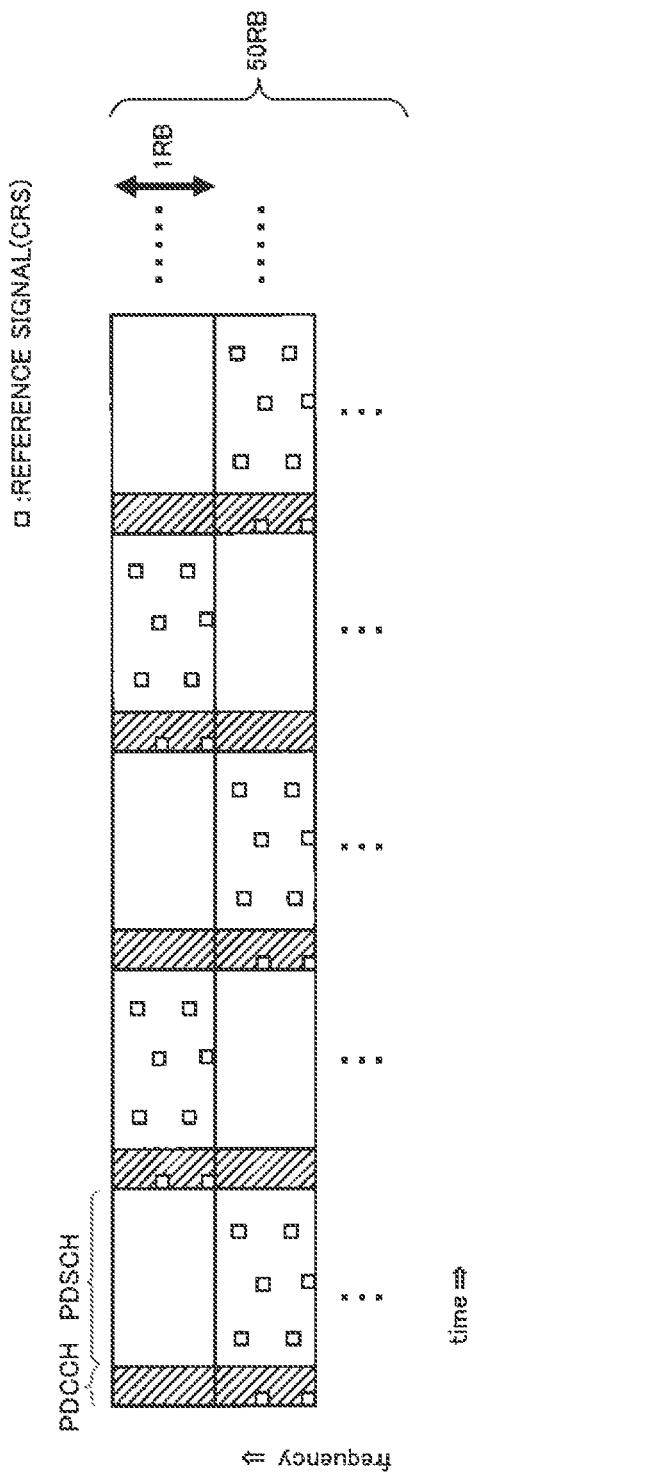
FIG. 18 is a diagram for explaining an illustrative example 1 of NCT and shows the carrier configuration of NCT carrier.

FIG. 17 and FIG. 18 are diagrams for explaining the illustrative example 1 of NCT. FIG. 17 shows the carrier configuration of LCT carrier as a comparative example. FIG. 18 shows the carrier configuration of NCT carrier.

As illustrated in FIG. 17, in each subframe of LCT carrier, downlink reference signals (CRSs: Cell-specific Reference Signals) are dispersedly arranged in time axis direction and frequency axis direction. Specifically, the downlink reference signals are arranged in all subframes, in the time axis direction. Moreover, the downlink reference signals are arranged in all resource blocks (RBs) in the frequency axis direction.

On the other hand, as illustrated in FIG. 18, in the NCT carrier, the downlink reference signals are arranged in only one subframe among two consecutive subframes, without arranging in all subframes in the time axis direction. Moreover, the downlink reference signals are arranged in only one RB among two consecutive RBs, without arranging in all RBs in the time axis direction.

According to such NCT carrier, it is possible to use radio resources, which has been used for transmitting the downlink reference signals, to transmit user data and the like by decreasing the density of downlink reference signals compared with the LCT carrier. Therefore, it is possible to improve a throughput.

(4.1.2) Illustrative Example 2 of NCT

Figure 19:
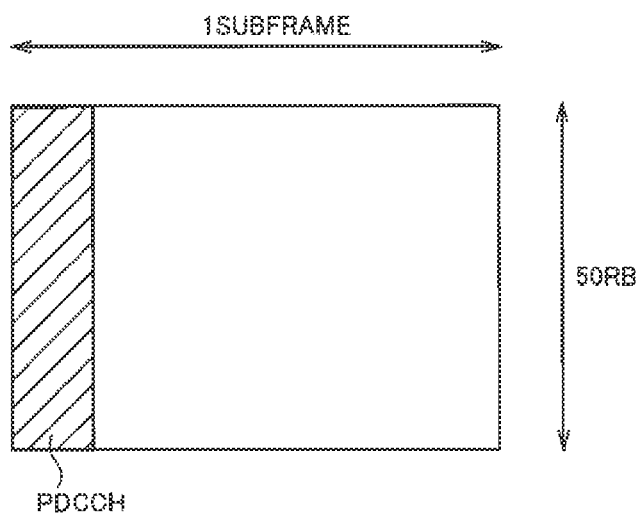
FIG. 19 is a diagram for explaining an illustrative example 2 of NCT and shows the carrier configuration of LCT carrier as a comparative example.
Figure 20:
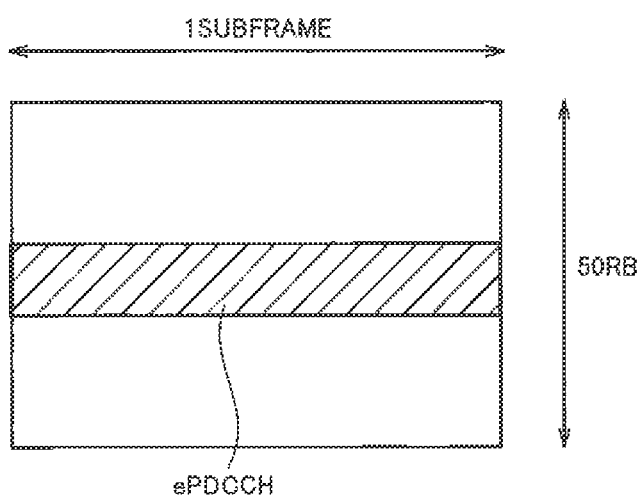
FIG. 20 is a diagram for explaining an illustrative example 2 of NCT and shows the carrier configuration of NCT carrier.

FIG. 19 and FIG. 20 are diagrams for explaining the illustrative example 2 of NCT. FIG. 19 shows the carrier configuration of LCT carrier. FIG. 20 shows the carrier configuration of NCT carrier.

As illustrated in FIG. 19, in the LCT carrier, a PDCCH region for transmitting downlink control signals is arranged in each of a plurality of subframes. The PDCCH region is arranged in all resource blocks and in an interval of the some head symbols of the subframe.

On the other hand, as illustrated in FIG. 20, an ePDCCH (enhanced PDCCH) region for transmitting downlink control signals is arranged in the NCT carrier. The ePDCCH region consists of a part of resource blocks among a plurality of resource blocks included in the subframe.

As described above, unlike the LCT where PDCCH regions are arranged in all resource blocks within one carrier (component carrier), ePDCCH regions are arranged in only a part of resource blocks, in NCT. Moreover, unlike LCT where PDCCH regions are arranged in the interval of the some head symbols in subframes, ePDCCH regions can be arranged in all symbols within subframes, in NCT.

(4.2) Overview of Fourth Embodiment

In the present embodiment, the eNB 200 changes at least one carrier among a plurality of carriers operated by the eNB 200 from the LCT to the NCT based on the neighbor base station information. Alternatively, the eNB 200 changes at least one carrier among a plurality of carriers operated by the eNB 200 from the NCT to the LCT based on the neighbor base station information.

The neighbor base station information is information on the capabilities of UEs 100 connected to eNB 200 (neighbor base station) adjacent to eNB 200. In the present embodiment, the neighbor base station information is information indicating the ratio between UEs 100 not supporting NCT (hereinafter referred to as "legacy UEs") and UEs 100 supporting NCT (hereinafter referred to as "NCT supporting UEs"), in a plurality of UEs 100 connected to the neighbor base station.

The information indicating the ratio between the legacy UEs and the NCT supporting UEs is one of the following information, for example.
   a ratio calculated from the number of legacy UEs and the number of NCT supporting UEs.
   a combination of the number of legacy UEs and the number of NCT supporting UEs.
   a combination of the total number of UEs and the number of legacy UEs, which are connected to the neighbor base station.
   a combination of the total number of UEs and the number of NCT supporting UEs, which are connected to the neighbor base station.

For example, in the operation environment illustrated in FIG. 7, the eNB 200 changes the NCT carrier operated by the eNB to LCT carrier when the ratio of legacy UEs among UEs 100 connected to the neighbor base station is high. Then, it is possible to accommodate many UEs by the LCT carrier even when many legacy UEs moves from the area of neighbor base station to the area of eNB 200. Hereinafter, a mode in which the eNB 200 operates all carriers or most carriers as LCT carriers is referred to as "legacy UE priority mode".

On the other hand, the eNB 200 changes the LCT carrier operated by the eNB to the NCT carrier when the ratio of NCT supporting UEs among UEs 100 connected to the neighbor base station is high. Then, it is possible to accommodate many NCT supporting UEs by the NCT carrier even when many NCT supporting UEs moves from the area of neighbor base station to the area of eNB 200. Hereinafter, a mode in which the eNB 200 operates all carriers or most carriers as NCT carriers is referred to as "NCT supporting UE priority mode".

(4.3) Operation According to Fourth Embodiment

Figure 21:
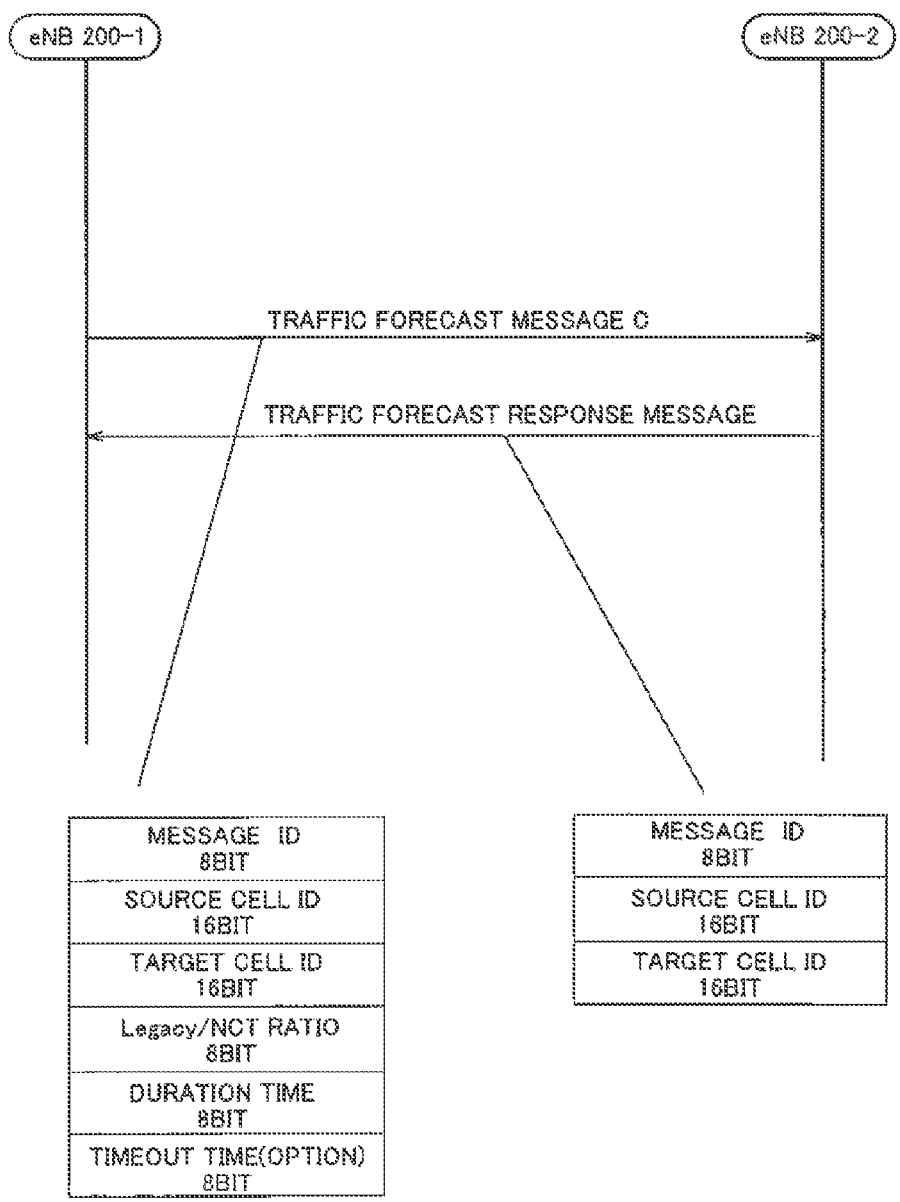
FIG. 21 is a diagram for explaining a Traffic Forecast message C (neighbor base station information) according to a fourth embodiment.

FIG. 21 is a diagram for explaining a Traffic Forecast message C (neighbor base station information) according to the present embodiment. Here, an example in which the Traffic Forecast message C is transmitted from eNB 200-1 to eNB 200-2 will be described.

As illustrated in FIG. 21, the Traffic Forecast message C includes information (hereinafter referred to as "legacy/NCT ratio information") indicating the ratio between legacy UEs and NCT supporting UEs among UEs 100 connected to eNB 200-1, instead of the load information described in the first embodiment. Other message configuration is similar to the first embodiment.

The eNB 200-1 may transmit the Traffic Forecast message C to the eNB 200-2 when the ratio of legacy UEs exceeds a threshold. Alternatively, the eNB 200-1 may transmit the Traffic Forecast message C to the eNB 200-2 when the ratio of NCT supporting UEs exceeds a threshold.

Figure 22:
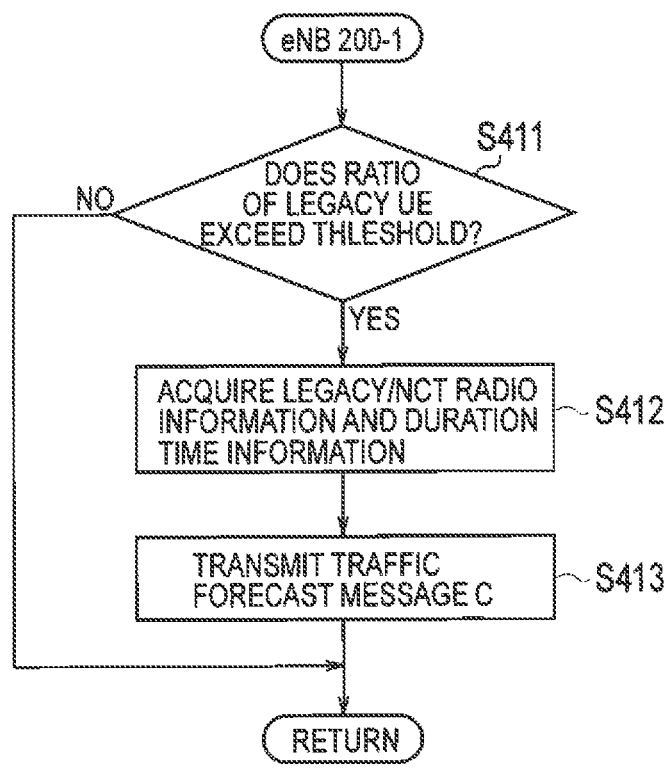
FIG. 22 is an operation flow diagram of eNB according to the fourth embodiment.

FIG. 22 is an operation flow diagram of eNB 200-1 according to the present embodiment. Here, an operation of eNB 200-1 regarding the transmission of the Traffic Forecast message C to the eNB 200-2 will be described.

As illustrated in FIG. 22, in step S411, the eNB 200-1 acquires capability information from each UE 100 connected to eNB 200-1, and then determines whether the ratio of legacy UEs exceeds a threshold. The capability information includes information on whether the NCT is supported. When the ratio of legacy UEs exceeds the threshold, the eNB 200-1 activates a duration time timer for counting a duration time.

When the determination in step S411 is "YES", in step S412, the eNB 200-1 acquires the legacy/NCT ratio information and the duration time information. Here, the duration time information may be the same value as the duration time timer, similar to the first embodiment.

In step S413, the eNB 200-1 transmits the Traffic Forecast message C including the legacy/NCT ratio information and the duration time information acquired in step S412, to the eNB 200-2 on the X2 interface or the S1 interface.

Figure 23:
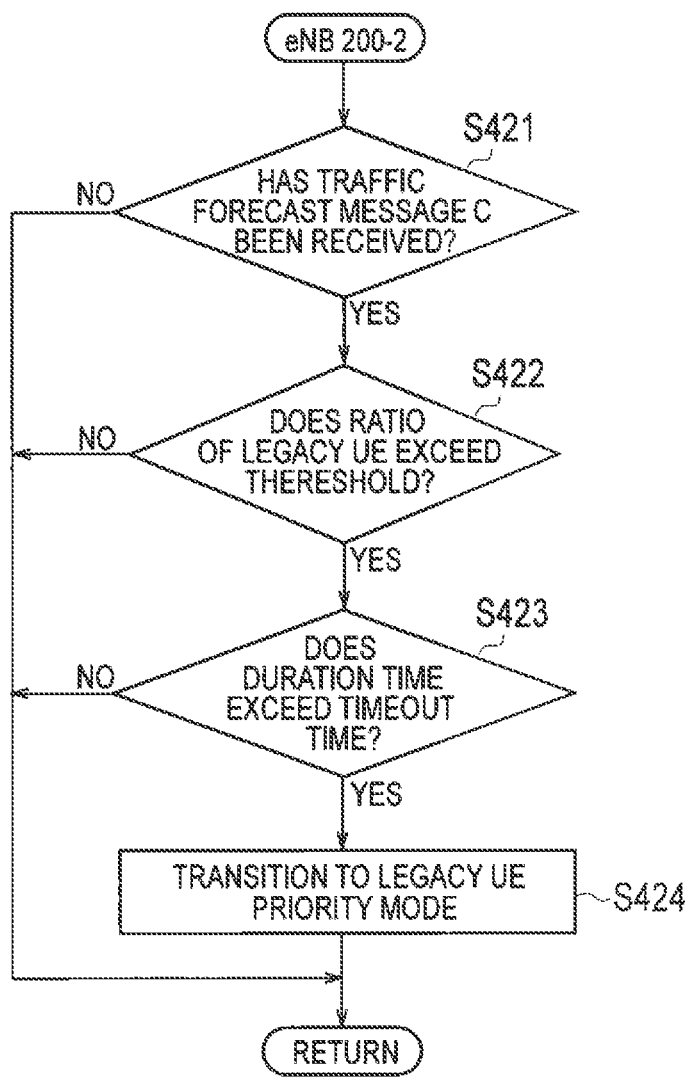
FIG. 23 is an operation flow diagram of neighbor eNB according to the fourth embodiment.

FIG. 23 is an operation flow diagram of eNB 200-2 according to the present embodiment. In the initial state of this flow, the eNB 200-2 is operated by the NCT supporting UE priority mode.

As illustrated in FIG. 23, in step S421, the eNB 200-2 determines whether the Traffic Forecast message C is received.

When the determination in step S421 is "YES", in step S422, the eNB 200-2 determines whether the sum total of the ratio of legacy UEs connected to the eNB 200-2 and the ratio of legacy UEs indicated by the legacy/NCT ratio status included in the received Traffic Forecast message C exceeds a threshold. Alternatively, the eNB 200-2 may determine whether the ratio of legacy UEs indicated by the legacy/NCT ratio status included in the received Traffic Forecast message C exceeds a threshold.

When the determination in step S422 is "YES", in step S423, the eNB 200-2 determines whether the duration time indicated by the duration time information included in the received Traffic Forecast message C exceeds a timeout time. If the received Traffic Forecast message C includes information indicating the timeout time, the eNB 200-2 may set the timeout time from the information. Alternatively, the timeout time may be set in advance based on the circumference environment of the eNB 200-2.

When the determination in step S423 is "YES", the eNB 200-2 shifts to the legacy UE priority mode. In addition, the eNB 200-2 may transmit a positive response (ACK) as the aforementioned Traffic Forecast Response message when the eNB 200-2 shifts to the legacy UE priority mode. The eNB 200-2 may transmit a negative response (NACK) as the aforementioned Traffic Forecast Response message when the eNB 200-2 does not shift to the legacy UE priority mode.

In this flow, an example where the eNB 200-2 shifts from the NCT supporting UE priority mode to the legacy UE priority mode is described. However, a shift from the legacy UE priority mode to the NCT supporting UE priority mode may be performed.

Figure 24:
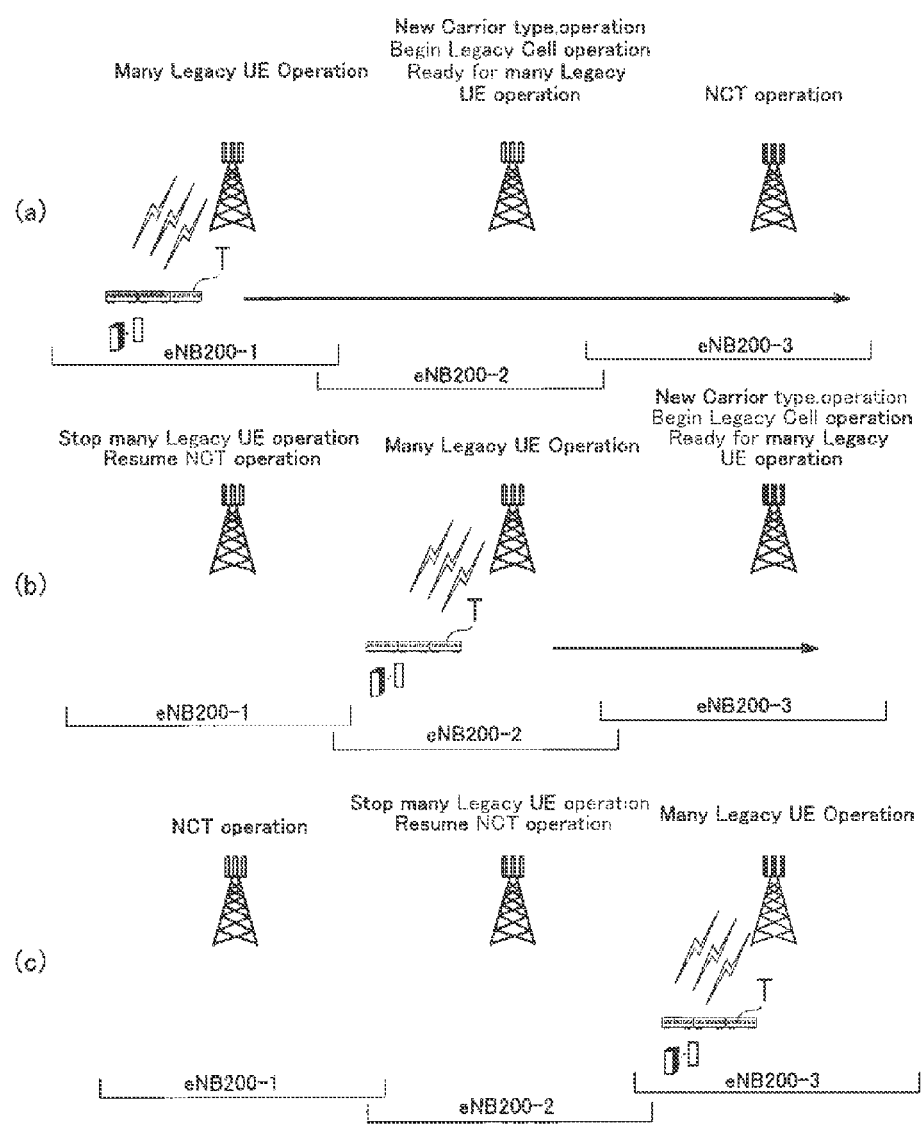
FIG. 24 is a diagram for explaining an illustrative example 1 of an operation according to the fourth embodiment.

FIG. 24 is a diagram for explaining an illustrative example 1 of operation according to the present embodiment. Here, a case where the shift from the NCT supporting UE priority mode to the legacy UE priority mode is performed will be described.

As illustrated in FIG. 24(a), the eNB 200-2 is installed adjacent to the eNB 200-1 and the eNB 200-3 is installed adjacent to the eNB 200-2. Within a communication area of each of the eNB 200-1, the eNB 200-2, and the eNB 200-3, a movement path (for example, a line) of the transportation traffic means T such as a train is provided. The transportation traffic means T passes through a corresponding communication area in the sequence of the eNB 200-1, the eNB 200-2, and the eNB 200-3. Many legacy UEs may exist within the transportation traffic means T.

In the example of FIG. 24(a), the eNB 200-1 operates in the legacy UE priority mode since the ratio of legacy UEs in its communication area is high. Furthermore, in response to the fact that the ratio of legacy UEs is high, the eNB 200-1 transmits the Traffic Forecast message C to the eNB 200-2 on the X2 interface or the S1 interface.

As illustrated in FIG. 24(b), after the Traffic Forecast message C is received, since the transportation traffic means T exists in the communication area of the eNB 200-2 and the ratio of legacy UEs is high, the eNB 200-2 shifts from the NCT supporting UE priority mode to the legacy UE priority mode. Furthermore, in response to the fact that the ratio of legacy UEs is high, the eNB 200-2 transmits the Traffic Forecast message C to the eNB 200-3 on the X2 interface or the S1 interface. Meanwhile, since there is no transportation traffic means T in the communication area of the eNB 200-1 and the ratio of legacy UEs is low, the eNB 200-1 returns to the NCT supporting UE priority mode.

As illustrated in FIG. 24(c), after the Traffic Forecast message C is received, since the transportation traffic means T exists in the communication area of the eNB 200-3 and the ratio of legacy UEs is high, the eNB 200-3 shifts from the NCT supporting UE priority mode to the legacy UE priority mode. Meanwhile, since there is no transportation traffic means T in the communication area of the eNB 200-2 and the ratio of legacy UEs is low, the eNB 200-2 returns to the NCT supporting UE priority mode.

FIG. 25 is a diagram for explaining an illustrative example 2 of operation according to the present embodiment. Here, a case where the shift from the legacy UE priority mode to the NCT supporting UE priority mode is performed will be described.

As illustrated in FIG. 25(a), the eNB 200-2 is installed adjacent to the eNB 200-1 and the eNB 200-3 is installed adjacent to the eNB 200-2. Within a communication area of each of the eNB 200-1, the eNB 200-2, and the eNB 200-3, a movement path (for example, a line) of the transportation traffic means T such as a train is provided. The transportation traffic means T passes through a corresponding communication area in the sequence of the eNB 200-1, the eNB 200-2, and the eNB 200-3. Many NCT supporting UE may exist within the transportation traffic means T.

In the example of FIG. 25(a), the eNB 200-1 operates in the NCT supporting UE priority mode since the ratio of NCT supporting UEs in its communication area is high. Furthermore, in response to the fact that the ratio of NCT supporting UEs is high, the eNB 200-1 transmits the Traffic Forecast message C to the eNB 200-2 on the X2 interface or the S1 interface.

As illustrated in FIG. 25(b), after the Traffic Forecast message C is received, since the transportation traffic means T exists in the communication area of the eNB 200-2 and the ratio of NCT supporting UEs is high, the eNB 200-2 shifts from the legacy UE priority mode to the NCT supporting UE priority mode. Furthermore, in response to the fact that the ratio of NCT supporting UEs is high, the eNB 200-2 transmits the Traffic Forecast message C to the eNB 200-3 on the X2 interface or the S1 interface. Meanwhile, since there is no transportation traffic means T in the communication area of the eNB 200-1 and the ratio of NCT supporting UEs is low, the eNB 200-1 returns to the legacy UE priority mode.

As illustrated in FIG. 25(c), after the Traffic Forecast message C is received, since the transportation traffic means T exists in the communication area of the eNB 200-3 and the ratio of NCT supporting UEs is high, the eNB 200-3 shifts from the legacy UE priority mode to the NCT supporting UE priority mode. Meanwhile, since there is no transportation traffic means T in the communication area of the eNB 200-2 and the ratio of NCT supporting UEs is low, the eNB 200-2 returns to the legacy UE priority mode.

(4.4) Modification of Fourth Embodiment

In the aforementioned fourth embodiment, eNB 200 which is a reception side of the Traffic Forecast message C determines the switch between the legacy UE priority mode and the NCT supporting UE priority mode.

However, eNB 200 which is a transmission side of the Traffic Forecast message C may determine the switch between the legacy UE priority mode and the NCT supporting UE priority mode.

In the present modification, the Traffic Forecast message C transmitted from the eNB 200 to the neighbor base station is information based on the capabilities of UEs 100 connected to the eNB 200 and is information requesting the change of at least one carrier of the neighbor base station from the LCT to the NCT. That is, the Traffic Forecast message C transmitted from the eNB 200 to the neighbor base station is information requesting, to the neighbor base station, shift from the legacy UE priority mode to the NCT supporting UE priority mode.

Alternatively, the Traffic Forecast message C transmitted from the eNB 200 to the neighbor base station is information based on the capabilities of UEs 100 connected to the eNB 200 and is information requesting the change of at least one carrier of the neighbor base station from the NCT to the LCT. That is, the Traffic Forecast message C transmitted from the eNB 200 to the neighbor base station is information requesting, to the neighbor base station, shift from the NCT supporting UE priority mode to the legacy UE priority mode.

(5) Other Embodiments

As described above, the present invention has been described with the embodiments. However, it should not be understood that those descriptions and drawings constituting a part of the present disclosure limit the present invention. From this disclosure, a variety of alternate embodiments, examples, and applicable techniques will become apparent to one skilled in the art.

The aforementioned first to third embodiments have described an example in which carrier configuration is changed such that all the second component carriers (CC2) are operated as the primary cells in the multi-UE mode. However, as illustrated in FIG. 26, the carrier configuration may be changed such that only subframes of a part of the second component carriers (CC2) are operated as the primary cells. In this case, in the second component carrier (CC2), both subframes for the primary cell and subframes for the secondary cell may exist. In this way, since the subframes for the secondary cell exist, it is possible to partially continue carrier aggregation.

The entire contents of U.S. provisional application No. 61/676,724 (filed on Jul. 27, 2012), U.S. provisional application No. 61/676,737 (filed on Jul. 27, 2012), and U.S. provisional application No. 61/676,755 (filed on Jul. 27, 2012) are incorporated herein by reference.

INDUSTRIAL APPLICABILITY

As described above, the present invention is available for a radio communication field such as mobile communication because it is possible to appropriately operate a plurality of carriers.

The invention claimed is:

1. A base station, comprising:
a controller including at least one processor and at least one memory coupled to the at least one processor, the at least one processor configured to execute processes of:
operating a predetermined carrier as a secondary cell and transmitting user data by using the predetermined carrier operated as the secondary cell;
receiving, from a neighbor base station, information on a user terminal connected to the neighbor base station, wherein the information includes a request message explicitly requesting the base station to change the operation of the predetermined carrier operated by the base station as the secondary cell; and
changing the operation of the predetermined carrier operated by the base station as the secondary cell only in accordance with the request message included in the information, wherein
the information including the request message is transmitted to the base station by the neighbor base station based upon a load level of the neighbor base station and a load level of the base station.

2. A base station, comprising:
a controller including at least one processor and at least one memory coupled to the at least one processor, the at least one processor configured to execute processes of:
transmitting, to a neighbor base station, information on a user terminal connected to the base station, wherein the information includes a request message explicitly requesting the neighbor base station to change an operation of a predetermined carrier operated by the neighbor base station as a secondary cell for transmitting user data, wherein
the information including the request message is transmitted to the neighbor base station by the base station based upon a load level of the neighbor base station and a load level of the base station.

3. An apparatus for controlling a base station, comprising:
at least one processor and at least one memory coupled to the at least one processor, the at least one processor configured to execute processes of:
operating a predetermined carrier as a secondary cell and transmitting user data by using the predetermined carrier operated as the secondary cell;
receiving, from a neighbor base station, information on a user terminal connected to the neighbor base station, wherein the information includes a request message explicitly requesting the base station to change the operation of the predetermined carrier operated by the base station as the secondary cell; and
changing the operation of the predetermined carrier operated by the base station as the secondary cell only in accordance with the request message included in the information, wherein
the information including the request message is transmitted to the base station by the neighbor base station based upon a load level of the neighbor base station and a load level of the base station.

4. An apparatus for controlling a base station, comprising:
at least one processor and at least one memory coupled to the at least one processor, the at least one processor configured to execute processes of:
transmitting to a neighbor base station, information on a user terminal connected to the base station, wherein
the information includes a request message explicitly requesting the neighbor base station to change an operation of a predetermined carrier operated by the neighbor base station as a secondary cell for transmitting user data, wherein
the information including the request message is transmitted to the neighbor base station by the base station based upon a load level of the neighbor base station and a load level of the base station.

5. The base station according to claim 1, wherein
the request message included in the information is a request for stopping the operation of the predetermined carrier as the secondary cell, and
the at least one processor is further configured to execute a process of stopping the operation of the predetermined carrier.

* * * * *